United States Patent
Kanatzidis et al.

(10) Patent No.: US 9,468,923 B2
(45) Date of Patent: Oct. 18, 2016

(54) POROUS POLYMER NETWORKS AND ION-EXCHANGE MEDIA AND METAL-POLYMER COMPOSITES MADE THEREFROM

(71) Applicant: Northwestern University, Evanston, IL (US)

(72) Inventors: Mercouri G. Kanatzidis, Wilmette, IL (US); Alexandros Katsoulidis, Evanston, IL (US)

(73) Assignee: Northwestern University, Evanston, IL (US)

( * ) Notice: Subject to any disclaimer, the term of this patent is extended or adjusted under 35 U.S.C. 154(b) by 38 days.

(21) Appl. No.: 14/643,086

(22) Filed: Mar. 10, 2015

(65) Prior Publication Data

US 2015/0190799 A1    Jul. 9, 2015

Related U.S. Application Data

(62) Division of application No. 13/888,705, filed on May 7, 2013, now Pat. No. 8,974,578.

(60) Provisional application No. 61/643,525, filed on May 7, 2012.

(51) Int. Cl.

| | | |
|---|---|---|
| *B01J 20/22* | (2006.01) | |
| *C08L 101/06* | (2006.01) | |
| *B01J 39/18* | (2006.01) | |
| *B01J 20/26* | (2006.01) | |
| *B01D 53/02* | (2006.01) | |
| *B01D 15/08* | (2006.01) | |
| *B01D 15/36* | (2006.01) | |
| *B01J 41/12* | (2006.01) | |
| *B01J 20/28* | (2006.01) | |
| *B01J 39/16* | (2006.01) | |
| *B01D 53/04* | (2006.01) | |

(52) U.S. Cl.
CPC .............. *B01J 39/185* (2013.01); *B01D 15/08* (2013.01); *B01D 15/362* (2013.01); *B01D 53/02* (2013.01); *B01J 20/262* (2013.01); *B01J 20/267* (2013.01); *B01J 20/28057* (2013.01); *B01J 20/28085* (2013.01); *B01J 39/165* (2013.01); *B01J 41/125* (2013.01); *B01D 53/04* (2013.01); *B01D 2253/1122* (2013.01); *B01D 2253/202* (2013.01); *B01D 2253/25* (2013.01); *B01D 2253/304* (2013.01); *B01D 2253/306* (2013.01); *B01D 2257/202* (2013.01); *B01D 2257/60* (2013.01); *B01D 2257/602* (2013.01); *Y10T 428/2982* (2015.01)

(58) Field of Classification Search
CPC .... B01D 15/08; B01D 15/362; B01D 53/02; B01D 53/04; B01D 2253/1122; B01D 2253/202; B01D 2253/25; B01D 2253/304; B01D 2253/306; B01D 2257/60; B01D 2257/602; B01D 2257/202; Y10T 428/2982; B01J 20/262; B01J 20/267; B01J 20/28057; B01J 20/28085; B01J 39/165; B01J 39/185; B01J 41/125
USPC .................... 96/153; 95/131, 133, 134, 900; 210/660, 681, 683, 688; 252/184; 423/241; 502/401, 402
See application file for complete search history.

(56) References Cited

U.S. PATENT DOCUMENTS

| | | | | |
|---|---|---|---|---|
| 5,476,878 | A * | 12/1995 | Pekala | B01J 13/0091 521/181 |
| 7,662,746 | B2 * | 2/2010 | Yaghi | B01J 20/0237 502/401 |
| 8,206,958 | B2 * | 6/2012 | Childs | B01D 67/0006 435/177 |
| 2011/0160511 | A1 * | 6/2011 | Hupp | C07C 7/12 585/823 |
| 2013/0047849 | A1 * | 2/2013 | Zhang | B01D 53/02 95/130 |
| 2013/0237411 | A1 * | 9/2013 | Matzger | B01J 20/226 502/401 |

OTHER PUBLICATIONS

Katsoulidis et al., "Mesoporous Hydrophobic Polymeric Organic Frameworks with Bound Surfactants. Selective Adsorption of C2H6 versus CH4", Chem. Mater. 2012, vol. 24, pp. 471-479, Jan. 2012.*

* cited by examiner

*Primary Examiner* — Frank Lawrence
(74) *Attorney, Agent, or Firm* — Bell & Manning, LLC

(57) ABSTRACT

Porous polymeric networks and composite materials comprising metal nanoparticles distributed in the polymeric networks are provided. Also provided are methods for using the polymeric networks and the composite materials in liquid- and vapor-phase waste remediation applications. The porous polymeric networks, are highly porous, three-dimensional structures characterized by high surface areas. The polymeric networks comprise polymers polymerized from aldehydes and phenolic molecules.

15 Claims, 18 Drawing Sheets

POROUS POLYMER NETWORKS AND ION-EXCHANGE MEDIA AND METAL-POLYMER COMPOSITES MADE THEREFROM

CROSS-REFERENCE TO RELATED APPLICATIONS

The present application is a divisional of U.S. non-provisional patent application Ser. No. 13/888,705 that was filed on May 7, 2013, which claims priority to U.S. provisional patent application No. 61/643,525 that was filed May 7, 2012, the entire contents of which are hereby incorporated by reference.

REFERENCE TO GOVERNMENT RIGHTS

This invention was made with government support under DE-FG36-08GO18137/A001 awarded by Department of Energy. The government has certain rights in the invention.

BACKGROUND

Porous polymers are a rapidly expanding category of materials. These polymers are characterized by a three dimensional network incorporating aromatic rings. They have been synthesized through a variety of organic reactions that produce stable linkages between rigid monomers and have a connectivity of greater than two. They are highly porous and, as such, able to provide high surface area materials. Drawbacks to the use of these materials are the high cost of the starting materials and the non-scalability of the polymerization reactions. Proposed applications of porous polymers include gas storage and separations.

SUMMARY

Porous, three-dimensional, aromatic polymeric networks comprising an organic polymer polymerized from aldehyde molecules and phenolic molecules are provided. In some embodiments, the walls of the polymeric network that define the pores in the polymeric network are functionalized with ion-exchangeable cations.

The polymeric networks comprising the ion-exchangeable cations can be used in methods for remediating hazardous materials, such as heavy metals, in the liquid or vapor-phase. These methods comprise exposing the polymeric networks to a sample comprising metal ions capable of undergoing ion-exchange with the ion-exchangeable cations, whereby said ion exchange occurs; and subsequently removing the polymeric network from the sample.

Also provided are composite materials that incorporate the porous polymeric networks. These composite materials comprise: (a) a porous, three-dimensional, aromatic polymeric network comprising an organic polymer polymerized from aldehyde molecules and phenolic molecules; and (b) metal nanoparticles distributed within the polymeric network.

The composite materials can be used in methods for remediating hazardous materials from samples, including vapor-phase samples. These methods comprise exposing the composite material to a vapor-phase sample comprising an unwanted element or molecule, such as iodine or Hg, whereby the unwanted element or molecules is adsorbed in the pores of the polymeric network; and subsequently removing the composite material from the sample.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Porous polymeric networks and composite materials comprising metal nanoparticles distributed in the polymeric networks are provided. Also provided are methods for using the polymeric networks and the composite materials in liquid- and vapor-phase remediation applications.

The porous polymeric networks, which are also referred to as polymeric organic frameworks (POFs), are highly porous, three-dimensional structures characterized by high surface areas. The polymeric networks comprise polymers polymerized from aldehydes and phenolic molecules. In some embodiments, the aldehydes comprise non-phenolic aromatic rings, such as six-membered aromatic rings. Thus, the resulting polymer networks comprise phenolic groups that are linked to one another through linkages comprising one or more non-phenolic aromatic rings.

Figure 1:
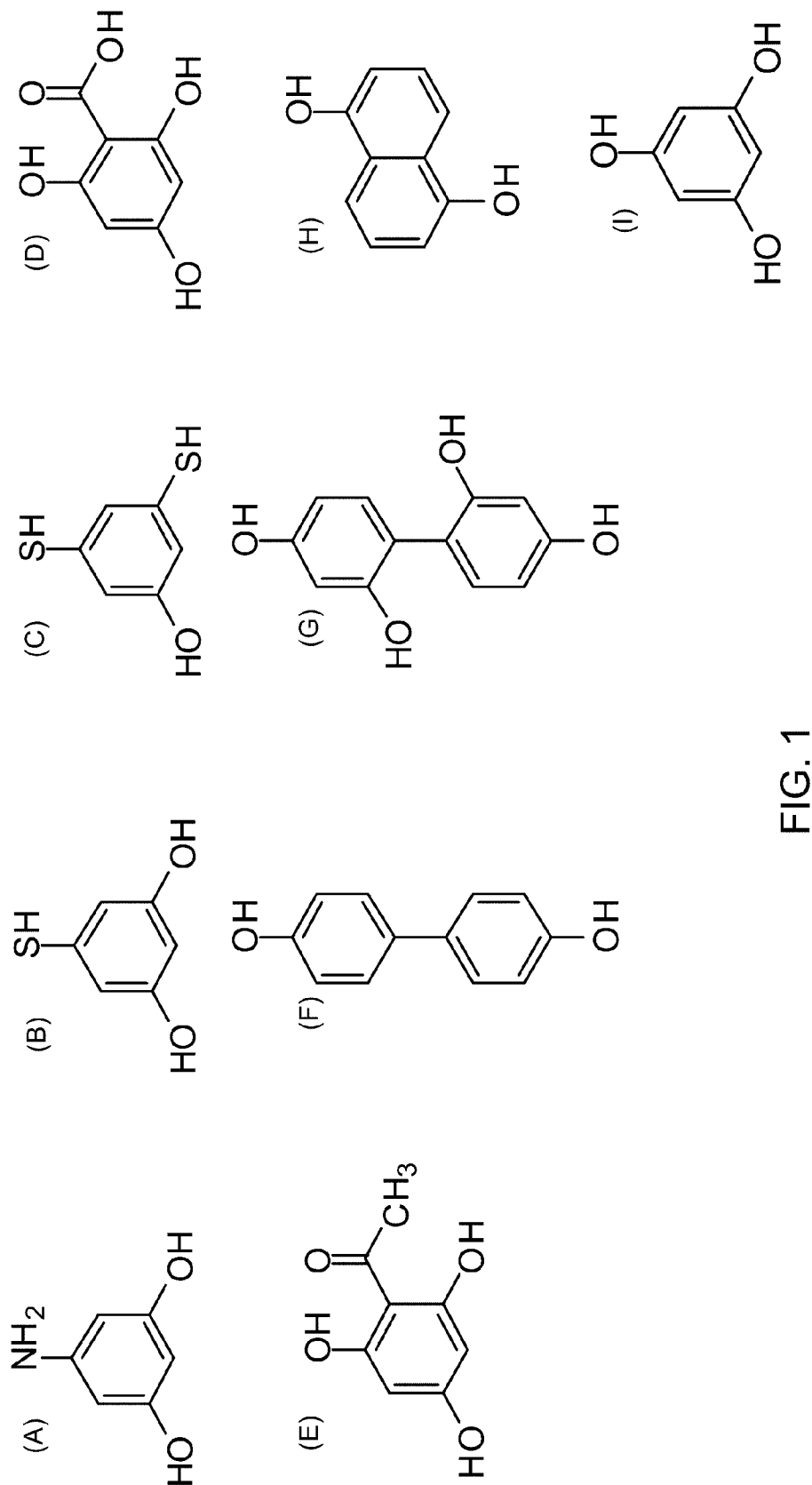
FIG. 1. The chemical structures for various phenolic molecules.

The phenolic molecules have reactive sites suitable electrophilic aromatic substitution, and during polymerization they can be linked through a formaldehyde carbon, followed by elimination of a molecule of $H_2O$. The phenolic molecules can comprise a single aromatic ring, or can include two or more fused or unfused aromatic rings. Examples of phenolic molecules that can be used in the polymerization of the POFs include those comprising 2 or more hydroxy groups, such as hydroxynaphthalenes (e.g., dihydroxynaphthalenes, such as 1,5-dihydroxynaphthalene) and phloroglucinol (1,3,5-trihydroxybenzene). The structures of 1,5-dihydroxynaphthalene and phloroglucinol are shown in FIG. 1, panels (H) and (I), respectively. The structures of other suitable electrophilic phenolic molecules are shown in FIG. 1, panels (A)-(G). As illustrated in this figure, the phenolic group can be functionalized with an —SH group or an —NH$_2$ group.

Figure 2:
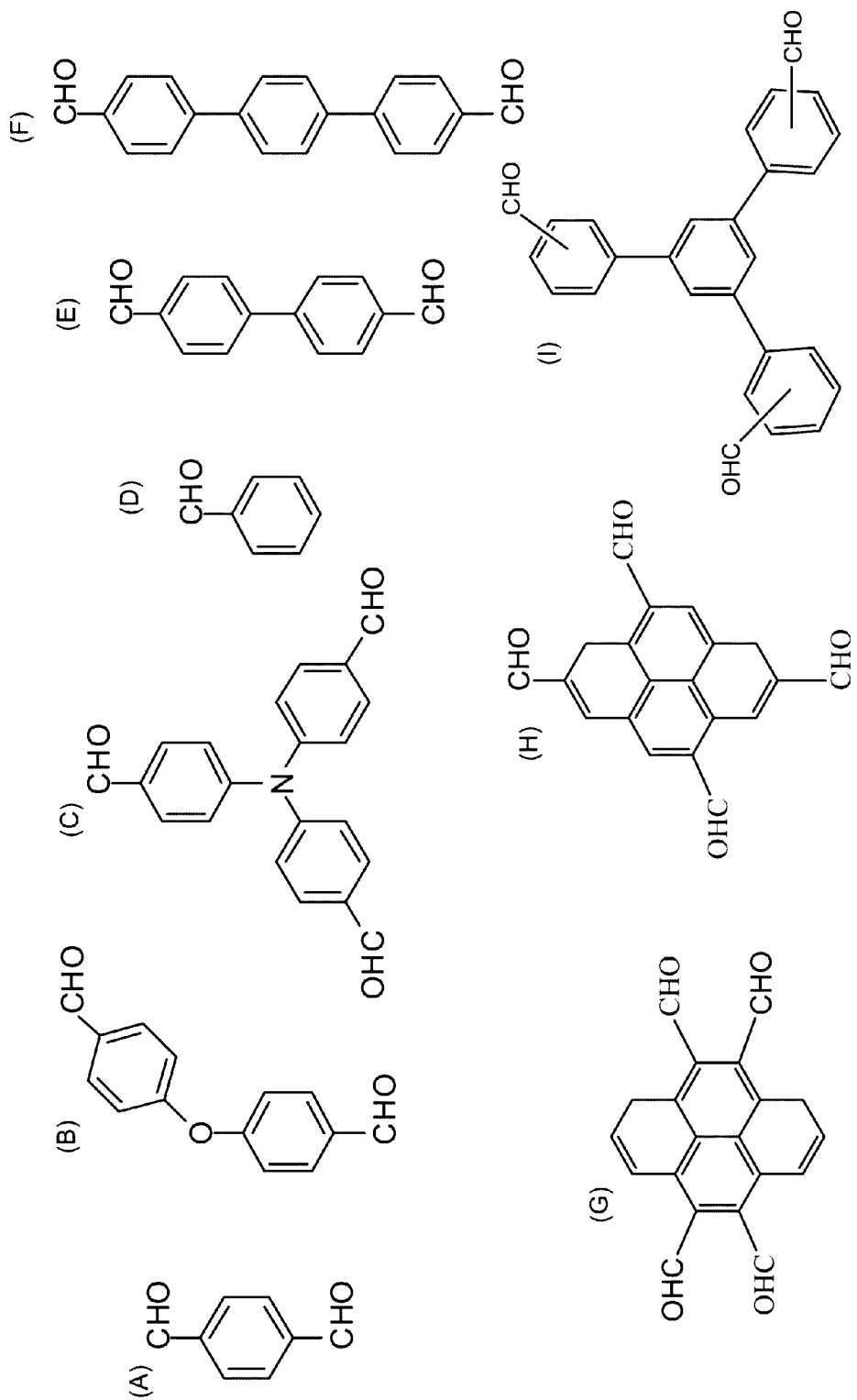
FIG. 2. The chemical structures for various aldehyde molecules.

The aldehydes with which the phenolic molecules react to form the organic polymer include dialdehydes, trialdehydes, and higher polyaldehydes. Like the phenolic molecules, the aldehydes may be aromatic molecules (e.g., benzaldehydes) with a single aromatic ring or with two or more (e.g., three or more, four or more, etc.) fused or unfused aromatic rings. Terephthalaldehyde is one example of an aldehyde that can be reacted with the phenolic molecules. The structure of terephthalaldehyde is shown in FIG. 2, panel (A). The structures of other suitable aldehydes are shown in FIG. 2, panels (B)-(I).

By way of illustration only, POFs that can be used to form the porous polymeric networks include POFs comprising the polymerization product of phloroglucinol and a benzaldehyde derivative. Specific examples of these are discussed in Katsoulidis et al., *Chem. Mater.* 2011, 23, 1818-1824, the entire disclosure of which is incorporated herein by reference. Other examples include POFs comprising the polymerization product of 1,5-dihydroxynaphthalene and terephthalaldehyde, which is described in greater detail in the Example I. The macroporous polymer derived from the acid catalyzed polymerization between phloroglucinol and terephthalaldehyde is described in greater detail in Example II.

Because the polymeric networks are highly porous, they are able to provide high-surface area materials. Some embodiments of the polymeric networks have BET surface areas of at least 500 $m^2$/g. This includes polymeric networks having BET surface areas of at least 900 $m^2$/g, at least 1000 $m^2$/g and at least 1200 $m^2$/g. The pores of the polymeric networks are of different sizes and they are extended in the three categories of pores (micropores, mesopores, and macropores). Thus, in some embodiments of the polymeric networks, the average pore diameter of the distribution of pores is greater than about 500 Å (macropores). However in other embodiments, the average pore diameter of the distribution of pores is no greater than about 500 Å (mesopores). This includes embodiments in which the average pore diameter of the distribution of pores is no greater than about 20 Å (micropores).

The walls of the porous polymeric network that define the pores can be functionalized with various chemical functionalities. For example, the as-formed polymeric networks typically have a high density of hydroxyl functionalities on the pore walls. For example, in some embodiments, the density of hydroxyl functionalities is in the range from 1 to 2 —OH groups per phenyl ring of the polymer. Alternatively, some or all of the hydroxyl groups can be deprotonated via ion exchange of the hydroxyl proton with other cations, such as alkali metal or alkaline earth metal cations. This can be accomplished, for example, by exposing the hydroxyl functionalized polymeric network to the other cations under basic conditions.

The resulting cation-exchanged polymeric networks can themselves be used as ion-exchange media in waste remediation applications, such as metal remediation in liquid (e.g., aqueous) and vapor-phase samples. In such applications, the ion-exchange medium is exposed to a sample comprising unwanted metal ions that are capable of undergoing ion exchange with the cations of the ion-exchange medium, under conditions in which said ion exchange occurs. The ion-exchange medium and the unwanted ions can then be removed from the sample. Metal ions that can be remediated using the present polymeric networks include heavy metals, such as $Ag^+$, $Au^+$, $Hg^{2+}$, $Cu^{2+}$, $Pb^{2+}$, $Cs^+$ and $Tl^+$. Other metal ions that can be remediated include Sn ions, Bi ions and Sb ions.

Notably, in some instances, the material that results from the ion-exchange between the ion-exchange medium and metal ions forms a useful composite material formed by the reduction of the metal ions by the organic polymer of the polymeric network. These composites comprise the porous, three-dimensional, polymeric network comprising the organic polymer polymerized from aldehyde molecules and phenolic molecules; and metal nanoparticles distributed within the polymeric network. An example of such a composite material comprising silver nanoparticles deposited in a POF is described in detail in the Example below. (As used herein, a nanoparticle is a particle having a diameter of no greater than about 100 nm. Thus, nanoparticles include particles having diameters of no greater than about 50, no greater than about 10 and no greater than about 5 nm.) The metal loading in these composite materials can be substantial. For example, in some embodiments, the composite materials comprise at least 10 percent by weight (wt. %) metal, based on the total weight of the nanoparticles and the organic polymer of the polymeric network. This includes composite materials that comprise at least 15 wt. %, at least 20 wt. % and at least 25 wt. % metal, based on the total weight of the nanoparticles and the organic polymer of the polymeric network.

The composite materials are useful in a wide variety of applications where supported metal nanoparticles have already proven useful. These include applications in catalysis, optics and anti-microbials. One application where the composite materials can be particularly advantageous is as adsorbents in the vapor-phase remediation of hazardous wastes, including radioisotopes, such as 129-iodine, that are released during the processing of nuclear fuels. In such applications, the composite material is exposed to a vapor-phase sample comprising an unwanted vapor-phase molecule or element, such as iodine or Hg(g), whereby the unwanted element is adsorbed in the pores of the POF. The composite material can then be removed from the sample.

Example I

This example illustrates a polymeric organic framework in the form of a monolithic polymeric organic framework, Mon-POF, prepared from terephthalaldehyde and 1,5-dihydroxynaphthalene. It exhibits high surface area, 1230 $m^2$ $g^{-1}$, and low bulk density, 0.15 $gcm^{-3}$. Mon-POF reduced $Ag^+$ to Ag nanoparticles forming a nanocomposite material with Ag loading of ~25 wt. %. The Ag loaded monolith captured iodine vapors and fixed them in the form of β-AgI.

Materials.

All reagents and solvents were used as received unless noted otherwise. Terephthalaldehyde, 1,5-dihydroxynaphthalene, silver nitrate, iodine and 1,4-dioxane were purchased from Aldrich Chemical Co. tetrahydrofuran (THF), ethanol, HCl and NaOH were purchased from VWR.

Synthesis of Monolith.

In a round bottom flask an amount of 0.320 g (2 mmol) of 1,5-dihydroxynaphthalene and 0.268 g (2 mmol) of terephthalaldehyde were added in 5 ml of dioxane. The mixture was kept under stirring at 70° C. Thirty minutes later 1 ml of aq. HCl 1M was added. The mixture was allowed to react for 3 h, transferred to a Teflon-lined autoclave, which was purged with $N_2$ to remove the air, and placed in an oven at 220° C. for 4 d. After cooling at room temperature, a brown piece having the internal shape of the autoclave was obtained. The monolith was placed in a beaker with THF and stayed undisturbed for 3 days to wash out any unreacted and oligomeric species. The solvent was decanted and refilled twice each day. After three days the THF was replaced with ethanol, where the monolith stayed for 2 days. Finally the monolith was supercritically dried with $CO_2$ using the Autosamdri 815B instrument of Tousimis. The mass of the dried product was 0.52 g and the yield of the polymerization corresponded to 94%. Similarly, two more aerogels were synthesized under the same conditions using 1 mmol of each monomer and 0.5 ml of aq. HCl 1M (Mon-POFcc) or 1 mmol of each monomer and 1 ml of aq. HCl 1M (Mon-POFc).

Preparation of Ag Nanoparticles in Mon-POF.

A piece of Mon-POF, 150 mg, was placed in 50 ml of an aqueous solution of 1M NaOH to exchange the protons of the —OH groups with $Na^+$. After 3 h the $Na^+$ exchanged Mon-POF was collected through filtration and washed with $H_2O$. The wet $Na^+$ Mon-POF was placed in 50 ml of $H_2O$ (resulting pH=10). In that system, 300 mg of $AgNO_3$ were added and allowed to react overnight. The collected monolithic piece was washed extensively with $H_2O$, soaked in ethanol to exchange the $H_2O$ and dried again with supercritical $CO_2$. The final product was called Ag@Mon-POF.

Capture of Iodine.

500 mg of $I_2$ were transferred in a two neck round bottom flask. On the top of the flask, fritted glassware was connected where a piece (≈50 mg) of Ag@Mon-POF was placed. Iodine vapors were produced after heating the flask at 70° C. and t were driven upwards with the nitrogen flow connected to the side neck of the flask.

Characterization Methods.

$N_2$ adsorption—desorption isotherms were measured at 77 K. The measurements were carried out in an ASAP 2020 and in a Tristar 3020 porosimeter of Micromeritics. The specific surface area was calculated according to the BET method ($0.05<P/P_0<0.25$). Total pore volume was estimated from the adsorbed amount at $P/P_0=0.97$. Micropore volume was determined from t-plots. (Lowell, S.; Shields, J. E.; Thomas, M. A.; Thommes, M. *Characterization of porous solids and powders: surface area, pore size and density*; Kluwer Academic Publishers: Dordrecht, 2004 p. 130.) NLDFT (cylindrical model) was applied to obtain the pore size distribution. The skeletal density of the aerogel was determined with helium pycnometry using the Accupyc II 1340 of Micromeritics. The bulk (geometrical) density was calculated from the physical dimensions of the aerogel. Solid state NMR spectra were recorded in a Varian 400 ATX spectrometer operating at 100 MHz for $^{13}C$ and 400 for $^1H$. The $^{13}C$ CPMAS measurements carried out at spinning rate of 10 kHz. Two pulse phase modulation (TPPM) $^1H$ decoupling was applied during the acquisition. The $^{13}C$ were given relative to tetramethylsilane as 0 ppm and calibrated by using adamantane as a secondary reference. XRD powder patterns were collected on a CPS 120 Inel diffractometer equipped with CuKα radiation. UV-vis-NIR diffuse reflectance spectra (DRS) were recorded with a Shimadzu UV-3101PC spectrophotometer. $BaSO_4$ powder was used as the 100% reflectance standard. The reflectance data were converted to absorption according to the Kubelka-Munk equation $a/S=(1-R)^2/2R$, where R is the reflectance and a and S are the absorption and scattering coefficient, respectively. Thermogravimetric analysis was performed in a Shimadzu TGA-50 thermal analyzer by heating each sample (≈10 mg) from room temperature (~23° C.) to 600° C. with a ramping rate of 5° C. $min^{-1}$ under nitrogen or air flow. Scanning electron microscopy (SEM) images were collected in a Hitachi S-3400N instrument with an accelerating voltage of 20 kV. High magnification SEM images were collected on a Leo 1525 (Carl Zeiss Microimaging Inc.). Before measurement, the samples were sputter coated with gold. TEM investigations were carried out in a JEOL 2100F transmission electron microscope operating at 200 kV accelerating voltage. The sample was dispersed in ethanol and mounted on a carbon coated copper grid.

Results and Discussion

The polymerization between terephthalaldehyde and 1,5-dihydroxynaphthalene is depicted in Scheme 1. Each carbonyl group reacts with two dihydroxynaphthalene molecules eliminating a water molecule. Thus, terephthalaldehyde is linked with four molecules of 1,5-dihydroxynaphthalene (i). On the other hand 1,5-dihydroxynaphthalene has four reaction sites, the ortho- and para-positions of each hydroxyl group, and it reacts with four terephthalaldehydes as well (ii). In this way an extended and highly cross-linked polymeric framework is created. In the past it has been shown that no catalyst is needed for the solvothermal polymerization between phloroglucinol and terephthalaldehyde. (Katsoulidis, A. P.; Kanatzidis, M. G. *Chem. Mater.* 2011, 23, 1818-1824.) However, 1,5 dihydroxynaphthalene is less nucleophilic and less reactive than phloroglucinol, having only one hydroxyl group per aromatic ring, instead of the three of phloroglucinol. In order to polymerize 1,5-dihydroxynaphthalene with terephthalaldehyde, HCl was used to activate the carbonyl groups.

Scheme 1. Polymerization reaction between terephthaladehyde and 1,5-dihydroxynaphthalene. The molecular structure of the polymer having the terephthalaldehyde group in the middle (i) and having the 1,5-dihydroxynaphthalene group in the middle (ii).

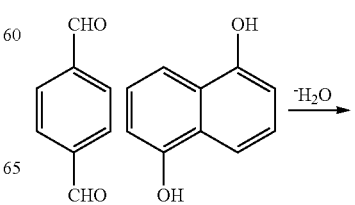

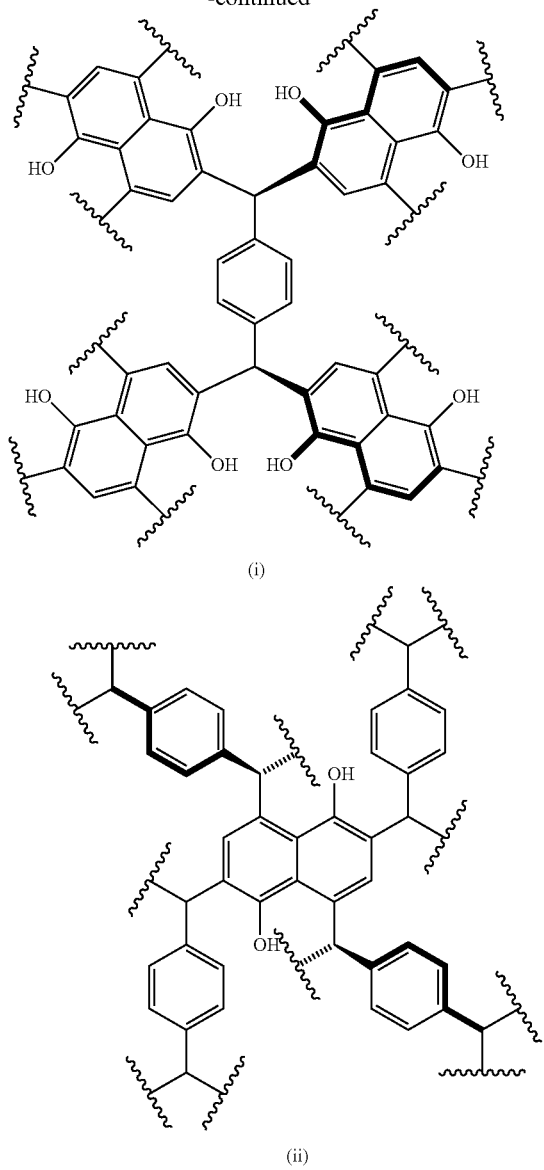

(i)

(ii)

Figure 3:
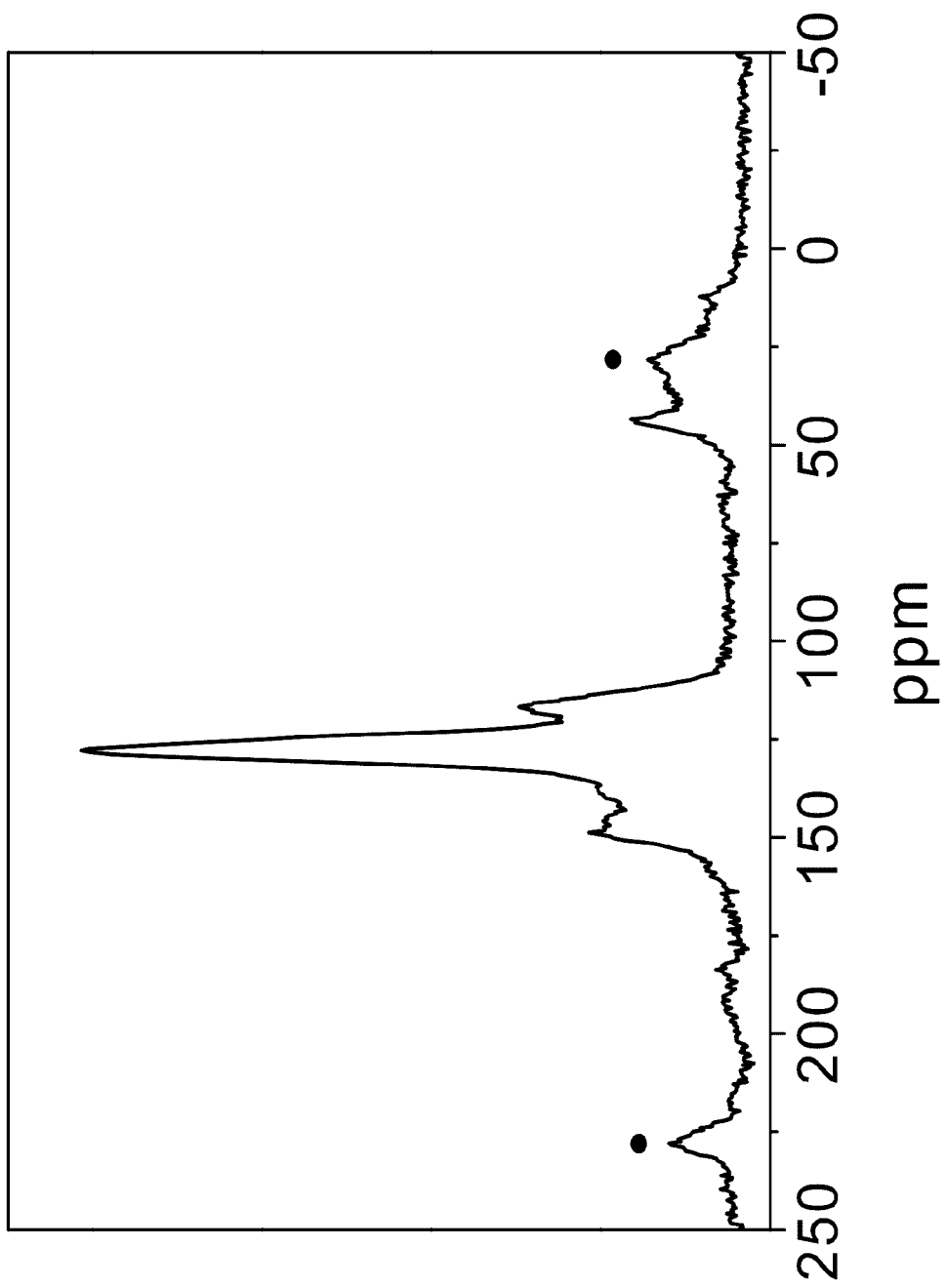
FIG. 3. Solid State $^{13}$C Cross Polarization Magic Angle Spinning (CPMAS) NMR of Mon-POF. The bullets correspond to the sidebands of the 128 ppm peak.

The formation of the polymer according to the above mentioned reaction was proven with solid state $^{13}$C CPMAS NMR. A typical spectrum of Mon-POF is presented in FIG. 3, where the side bands of the big peak are denoted with bullets. The resonance of the aldehyde carbonyl carbons, 195 ppm, did not appear and a new one emerged at 44 ppm, which is attributed to the methyne bridge carbons. Reacted ortho and para carbons of 1,5-dihydroxynaphthalene exhibited a signal at 116 ppm. The big peak at 128 ppm peak was assigned to the aromatic carbons and the resonance at 150 ppm corresponds to phenoxy carbons. A shoulder at 145 ppm corresponds to carbons 1 and 4 of the aldehyde originating ring. No peaks were observed in the spectra in the range of 55-75 ppm indicating the absence of any adsorbed solvent molecule, dioxane, THF or ethanol from the synthesis and washing procedure.

The Mon-POF was completely dry after supercritical drying, as proved by the TGA curves (FIG. 4) where no mass loss was observed up to 330° C., either under $N_2$ or under air. The aerogel was gradually decomposed under $N_2$ at elevated temperatures, but was considered thermally stable, retaining 70% of its initial mass at 600° C. Under air the aerogel was oxidized rapidly and the combustion was completed at 530° C.

Figure 5:
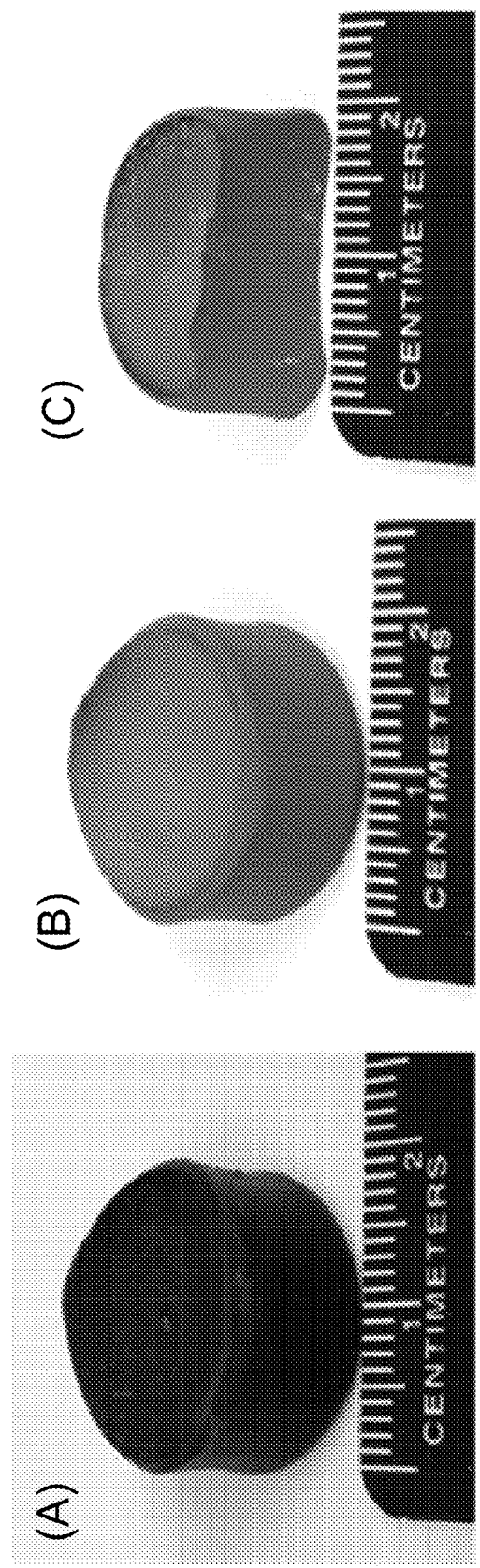
FIG. 5. Images of as prepared (A) and dried (B) Mon-POF and the cross-section of the dried Mon-POF (C).
Figure 6:
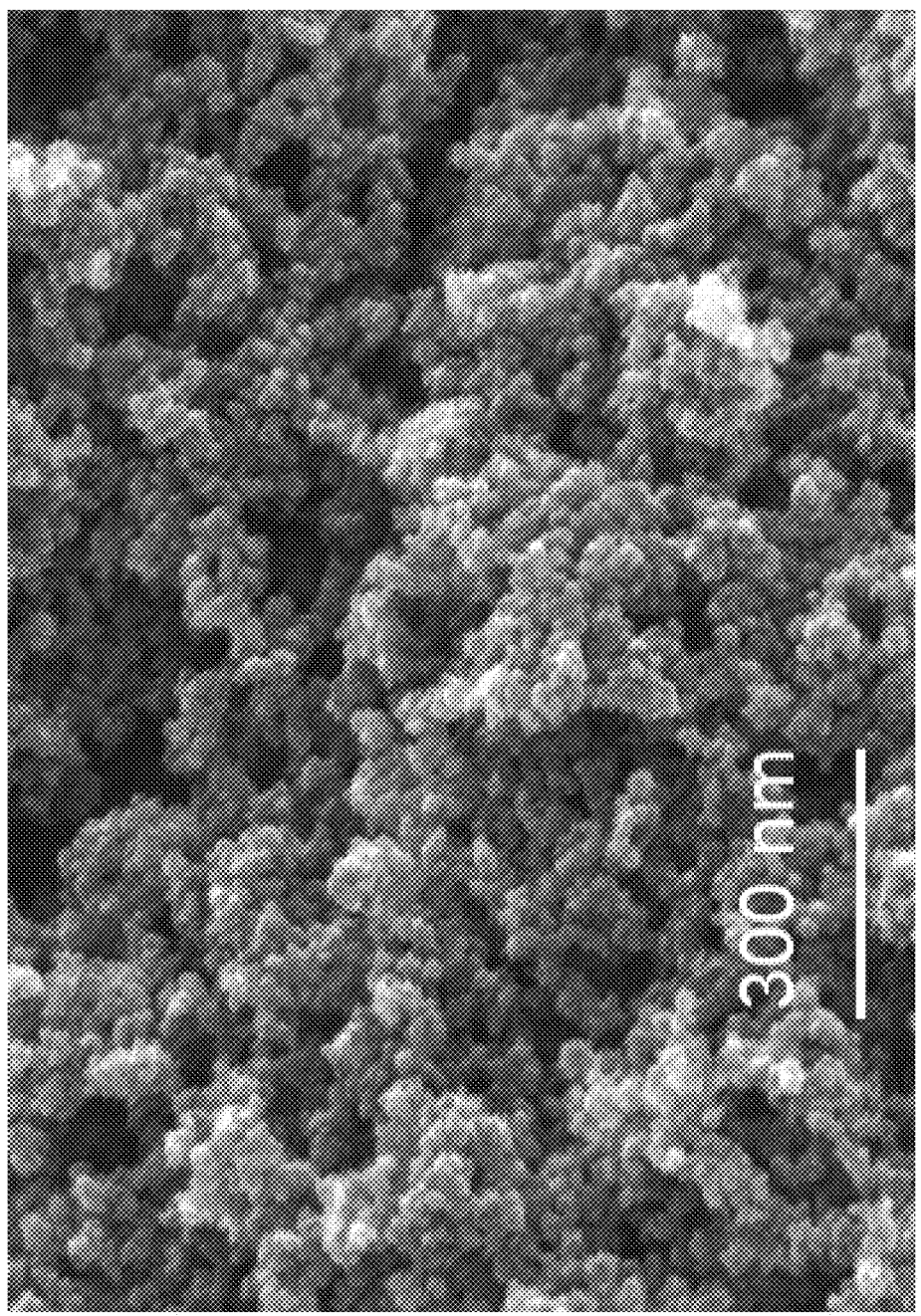
FIG. 6. SEM image of Mon-POF.

The untreated sample after the solvothermal synthesis had the internal shape of the autoclave (FIG. 5A) and exhibited a bulk (geometrical) density of 1.27 gcm$^{-3}$. Even though the sample looked dry, it contained a significant amount of dioxane and its mass, 4.8 g, was much higher than the monomers' mass, 0.588 g. After solvent exchange with THF and ethanol and $CO_2$ supercritcal drying, the shape and the dimensions of the monolith were preserved (FIG. 5B) and the bulk density was decreased to 0.15 gcm$^{-3}$. It could be seen from the cross-sectional image that the texture of the sample was very homogeneous (FIG. 5C). Despite the low bulk density, Mon-POF was strong enough to support a zirconia ball on the top of it, which was 250 times heavier than the monolithic piece. Mon-POF was handled easily and it could be cut to smaller pieces with a blade. SEM image (FIG. 6) shows that Mon-POF comprises aggregated nanoparticles 20-40 nm in diameter. The skeletal density of dried Mon-POF was measured as 1.37 gcm$^{-3}$ according to helium pycnometry. The porosity, $\epsilon$, of Mon-POF, calculated from equation (1) where $p_b$ and $p_s$ are bulk and skeletal density, respectively, equaled 89%.

$$\varepsilon = \left(1 - \frac{p_b}{p_s}\right) * 100\% \quad (1)$$

Figure 7:
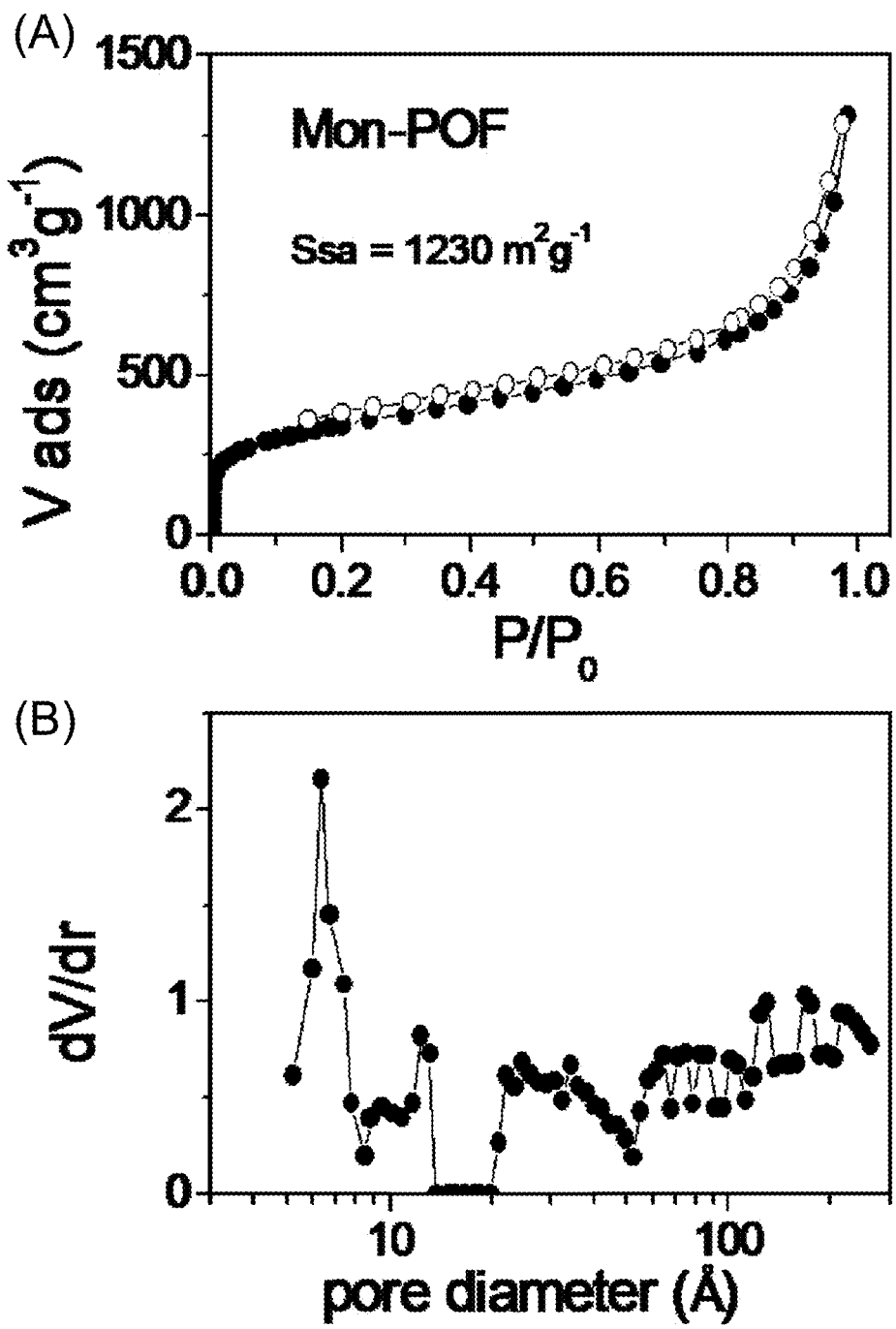
FIG. 7. (A) $N_2$ adsorption-desorption isotherm and (B) non-local density functional theory (NLDFT) pore size distribution of Mon-POF.

A typical $N_2$ adsorption-desorption isotherm of Mon-POF is presented in FIG. 7A. It corresponds to a type II isotherm, according IUPAC classification, suggesting the predominant macroporous character of the monolithic aerogel. But, at the same time, the high uptake at very low relative pressure gave evidence of significant microporosity. The specific surface area (BET) was calculated as 1230 m$^2$ g$^{-1}$ and the total pore volume as 1.46 cm$^3$ g$^{-1}$ (P/P$_0$=0.97). The existence of micropores on Mon-POF was proven using the t-plot method showed a micropore volume of 0.2 cm$^3$ g$^{-1}$ (Table 1). (Lowell, S.; Shields, J. E.; Thomas, M. A.; Thommes, M. *Characterization of porous solids and powders: surface area, pore size and density*; Kluwer Academic Publishers: Dordrecht, 2004 p. 130.) The pore size distribution calculated applying NLDFT exhibited a maximum at 6 Å psd (FIG. 7B) and some lower peaks in the whole range of diameters showed that beyond micropores the distribution of pores is very broad. The distribution in the range of macropores (>500 Å) cannot be obtained from $N_2$ porosimetry.

TABLE 1

Synthesis parameters, porous properties and yield of Mon-POFs.

| Sample | Concentration - Catalyst | Specific surface area (m$^2$g$^{-1}$) | Total pore volume (cm$^3$g$^{-1}$) | Micropore volume (cm$^3$g$^{-1}$) | Yield (%) |
|---|---|---|---|---|---|
| Mon-POFcc | 1 mmol/5 ml - 0.5 ml HCl | 946 | 0.84 | 0.24 | 84 |
| Mon-POFc | 1 mmol/5 ml - 1 ml HCl | 1117 | 1.17 | 0.22 | 90 |
| Mon-POF | 2 mmol/5 ml - 1 ml HCl | 1230 | 1.46 | 0.20 | 94 |

The formation of a gel was strongly influenced by the parameters that affect the polymerization reaction rate, such as temperature, catalyst and concentration of reactants. To investigate the effect of reaction rate on the formation of Mon-POFs various samples were synthesized using half the concentration of starting materials and/or half the amount of catalyst, in an aqueous solution HCl 1M, under the same temperature profile. Mon-POFcc was synthesized using 1 mmol of monomers per 5 ml of dioxane, instead of the 2 mmol used for the Mon-POF, and 0.5 ml of HCl 1M, instead of the 1 ml used for the Mon-POF. Mon-POFc was synthesized using 1 mmol of monomers per 5 ml of dioxane and 1 ml of HCl. From both syntheses monolithic aerogels were obtained in lower yield, 84 and 90% for Mon-POFcc and Mon-POFc, respectively, (Table 1) in comparison to 94% of Mon-POF. They exhibited similar molecular structure as Mon-POF, based on the fact that the $^{13}$C CPMAS NMR spectra were very similar and the $N_2$ adsorption-desorption isotherms were also of type II.

Figure 8:
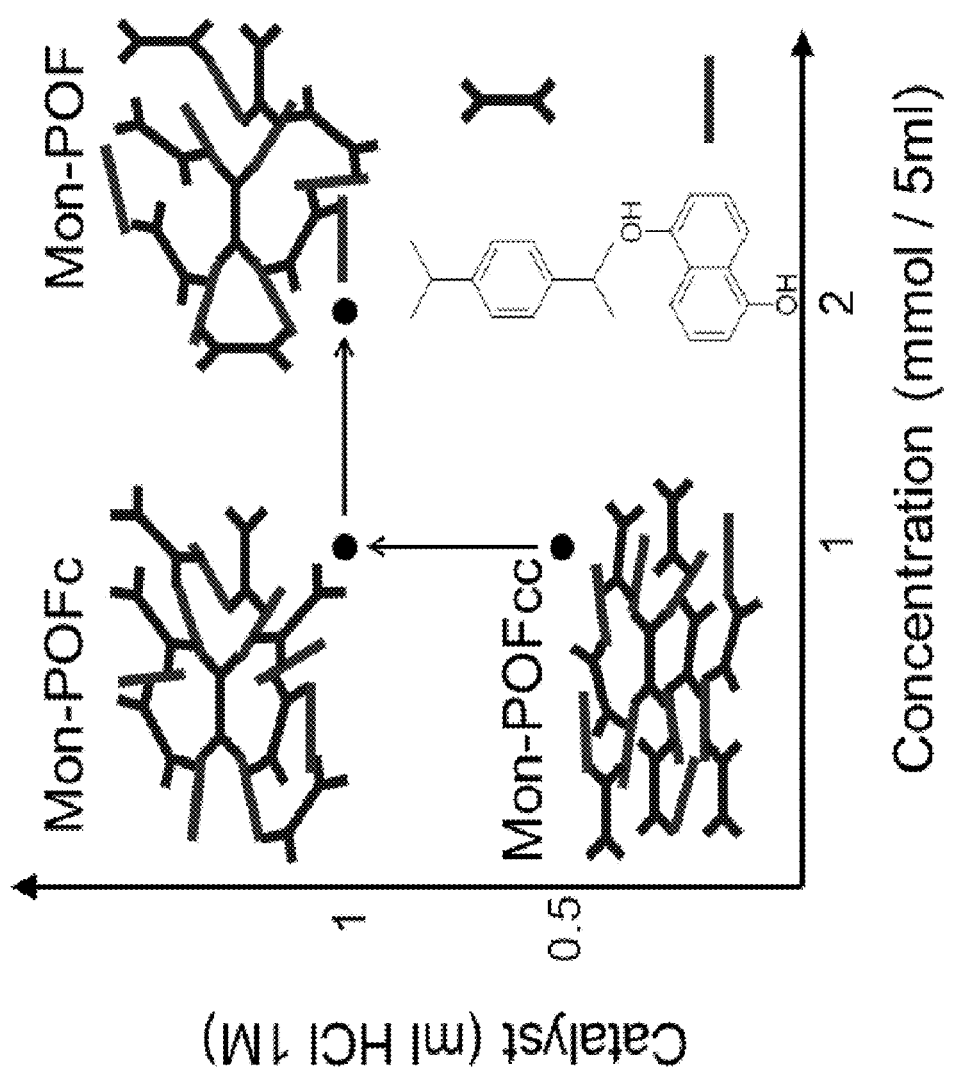
FIG. 8. The evolution of Mon-POFs porosity with concentration of monomers in dioxane and amount of catalyst.

The porous properties of the monoliths are also listed in Table 1. The specific surface areas and the total pore volumes of Mon-POFs followed the same trend as the yield of the polymerization, which increased with the reaction rate. On the other hand, the values of micropore volume showed the opposite trend, decreasing in moving from Mon-POFcc to Mon-POF. The evolution of the porous properties can be explained by considering the framework's extension and relaxation. At low reaction rate the fragments of the framework have time to relax and achieve better packing before growing larger, resulting in materials with higher microporosity. On the other hand, at higher reaction rates the framework grew rapidly, with less time to pack efficiently, forming larger and more tortuous polymeric units. This produced materials with higher total pore volume. The effect of the reaction rate on the porous properties of monoliths is represented in FIG. 8.

Figure 9:
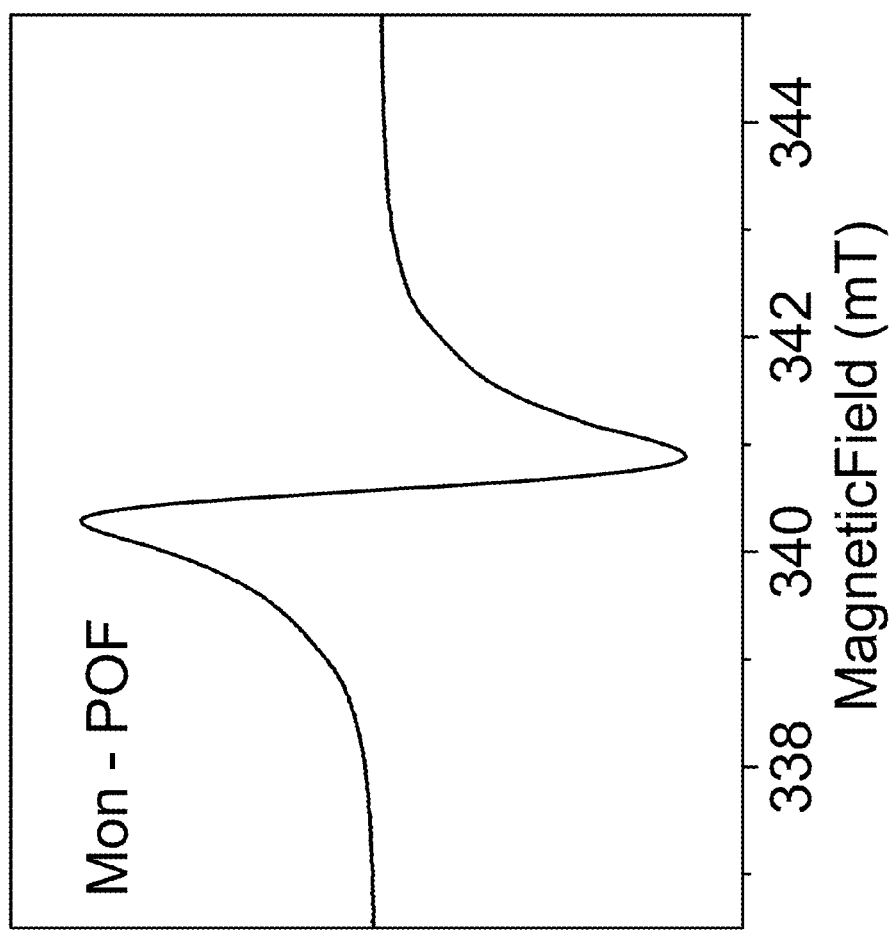
FIG. 9. Solid state Electron Paramagnetic Resonance (EPR) spectra of Mon-POF.

Mon-POF was characterized with continuous wave (CW) EPR spectroscopy at room temperature (FIG. 9). This compound was paramagnetic and showed a strong EPR signal, which was 4 mT wide and centered around 340.5 mT (g factor=2.006). The stabilization of unpaired electrons on the POFs was a simultaneous effect of the polymerization reaction and was observed in all the samples of this family. The existence of unpaired electrons are responsible for the semiconductor like optical properties as explained below.

Figure 10:
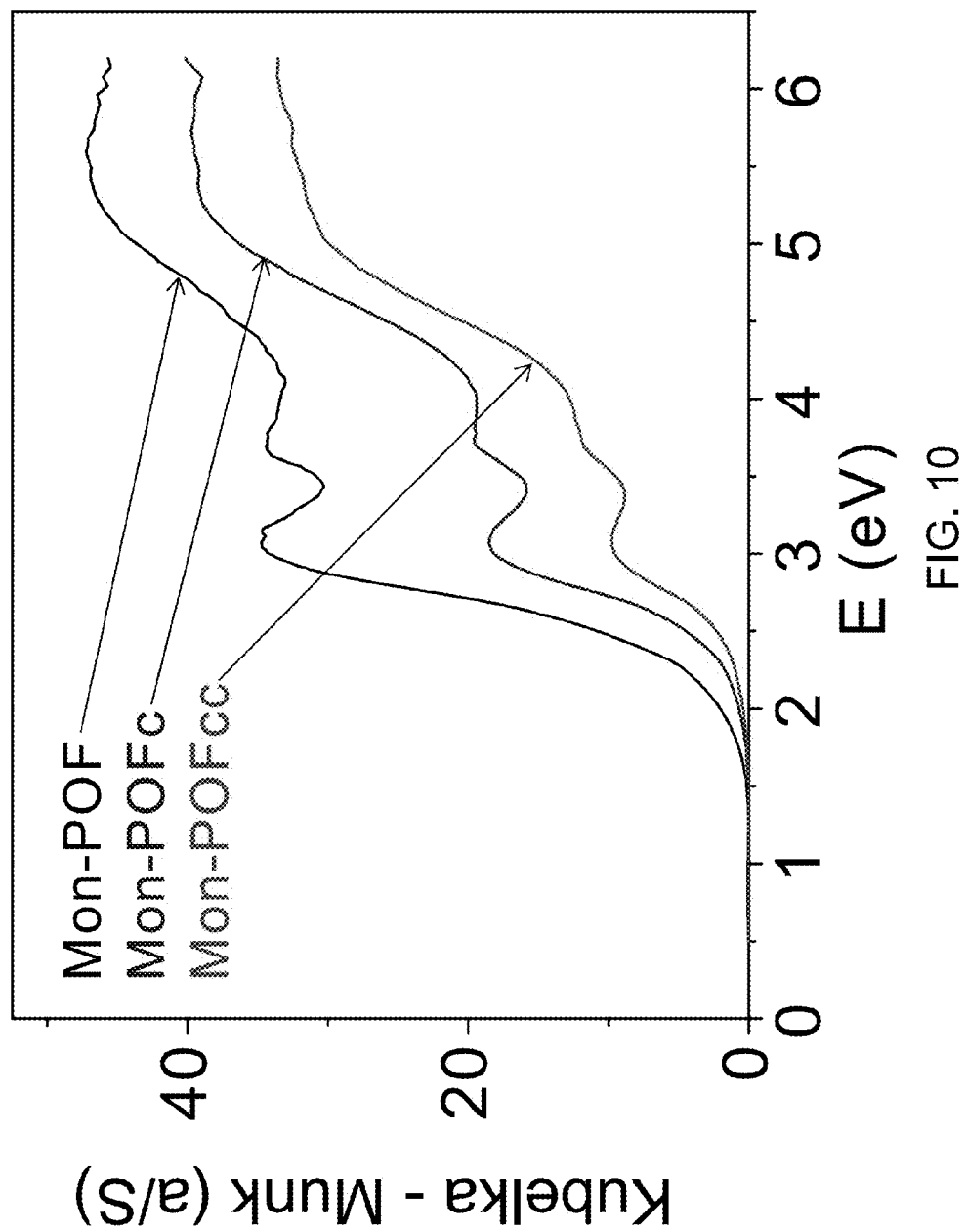
FIG. 10. The solid state electronic absorption spectra of Mon-POFs (lower curve=Mon-POFcc; middle curve=Mon-POFc; upper curve=Mon-POF).

Like \previous POFs compounds, Mon-POFs showed semiconductor-like optical absorption properties. (Katsoulidis, A. P.; Kanatzidis, M. G. *Chem. Mater.* 2011, 23, 1818-1824.) The solid state absorption spectra of Mon-POFs are given in FIG. 10. Mon-POF exhibited a band gap of 2.3 eV and a broad absorption feature at >4 eV. The other two samples, Mon-POFc and Mon-POFcc, had band gaps at 2.5 eV and the intensity of absorption from 2 to 4 eV was remarkably weaker than that of the Mon-POF. The differences in optical properties were ascribed to the size of the polymeric units in each monolith. As mentioned above, the higher the reaction rate, the greater the size of the polymeric unit and greater the delocalization of electrons within the framework. Thus, Mon-POF prepared at higher reaction rate exhibited the lowest band gap and the highest optical absorption. The molecular structure of Mon-POF, as depicted in Scheme 1, is not highly conjugated, however, the existence of unpaired electrons, which are probably localized on the methine carbon promoted the conjugation and the optical absorption properties (Scheme 2).

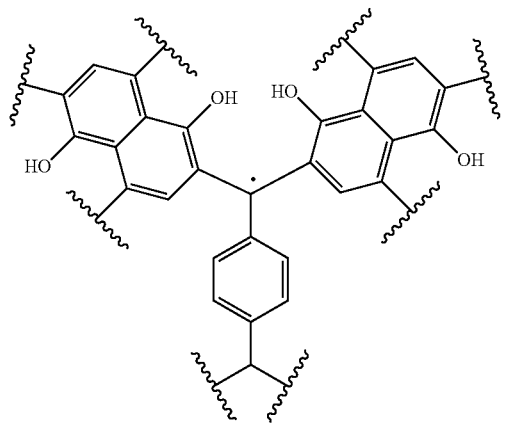

Scheme 2. A conjugated structure of Mon-POF.

The stability of Mon-POF in water was tested under acidic and basic conditions. Two pieces of Mon-POF were soaked for 24 h in aqueous solutions of HCl 1M (pH=0) and NaOH 1M (pH=14), respectively. Neither of the monoliths dissolved but remained as a single piece. Their $^{13}$C CPMAS NMR spectra after the acid and base treatment were the same in comparison to raw Mon-POF. After the base treatment, there was one additional peak for Mon-POF (NaOH), at 165 ppm, which was assigned to phenoxy carbons with protons exchanged with $Na^+$ cations. A similar phenomenon of partial exchange of protons with $Na^+$ was observed in phloroglucinol POFs as well. (Katsoulidis, A. P.; Kanatzidis, M. G. *Chem. Mater.* 2011, 23, 1818-1824.) $N_2$ adsorption-desorption isotherms revealed that both monoliths retained more than 75% of their surface area. Mon-POF (HCl) exhibited a surface area 1059 $m^2$ $g^{-1}$ and Mon-POF (NaOH) exhibited a surface area 929 $m^2$ $g^{-1}$. The porosity of Mon-POF decreased very slowly with time and no precautions were needed for the monolith's storage. The $N_2$ adsorption-desorption isotherms were measured again in 3 and 6 month intervals after synthesis and the specific surface areas decreased to 1049 and 914 $m^2$ $g^{-1}$, respectively.

Figure 4:
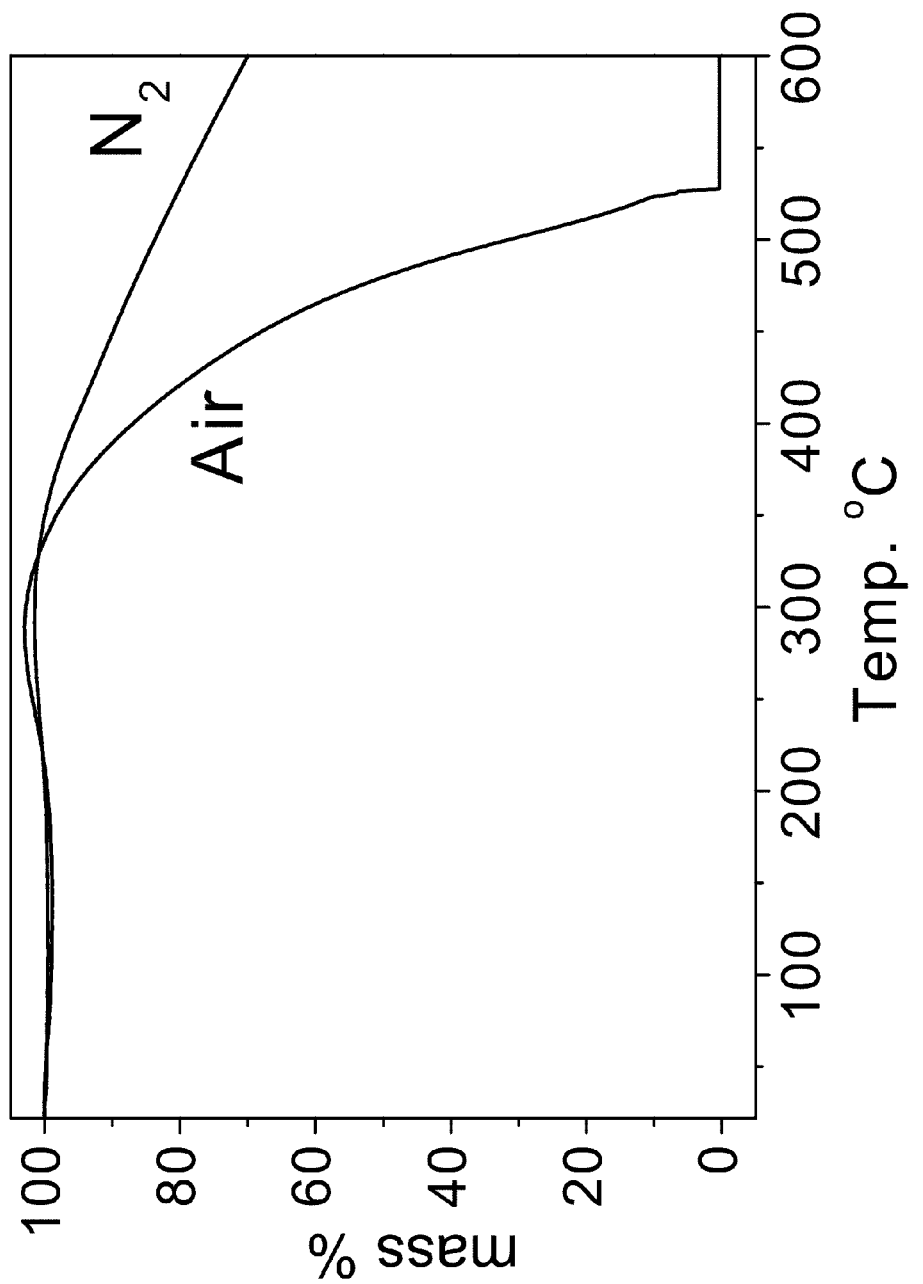
FIG. 4. Thermogravimetric analysis of Mon-POF under $N_2$ and air.
Figure 11:
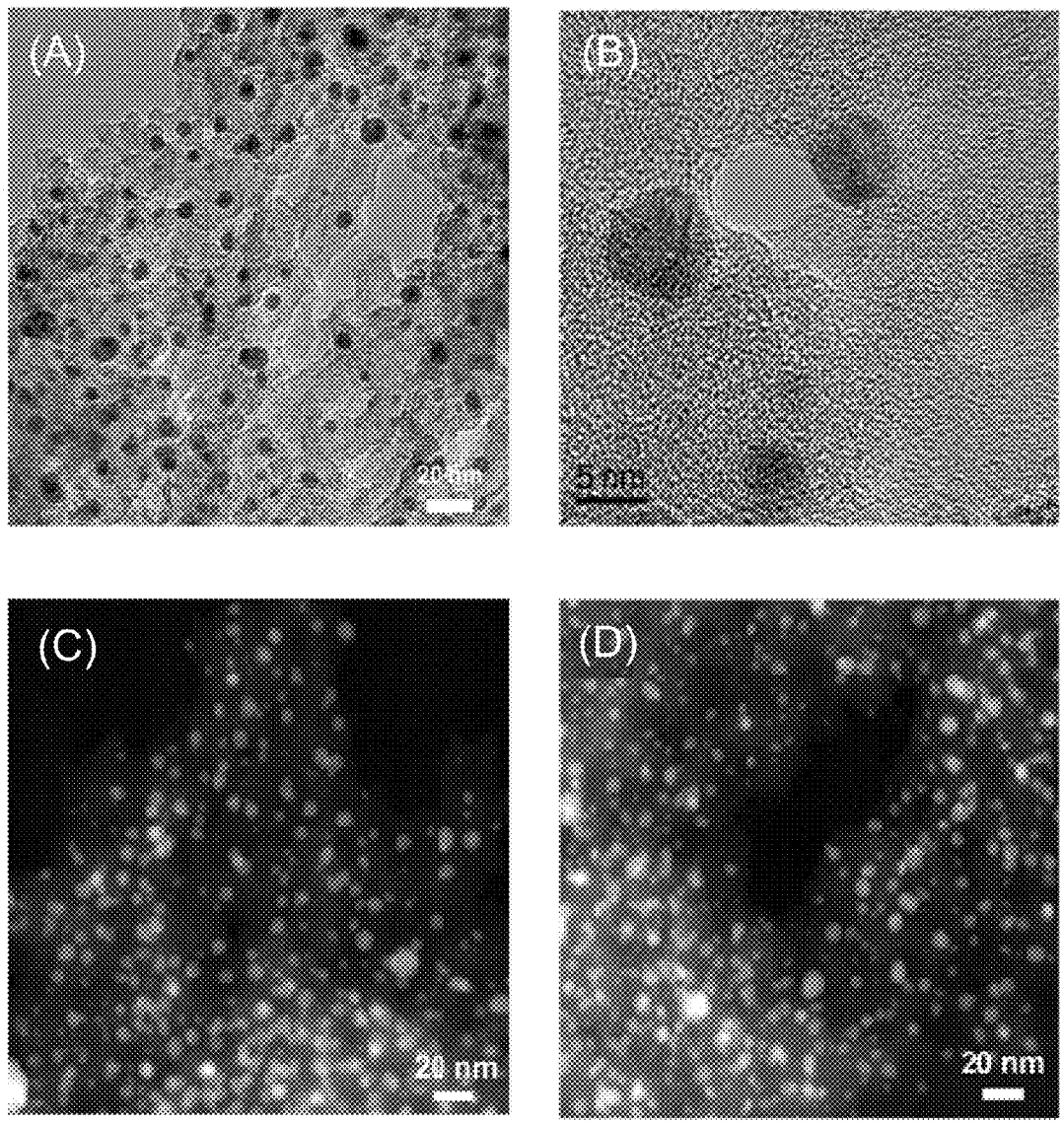
FIG. 11. (A) (B) TEM images of Ag nanoparticles (dark spots) dispersed in Mon-POF. (C) (D) TEM images of Ag nanoparticles (bright spots) in Mon-POF.
Figure 12:
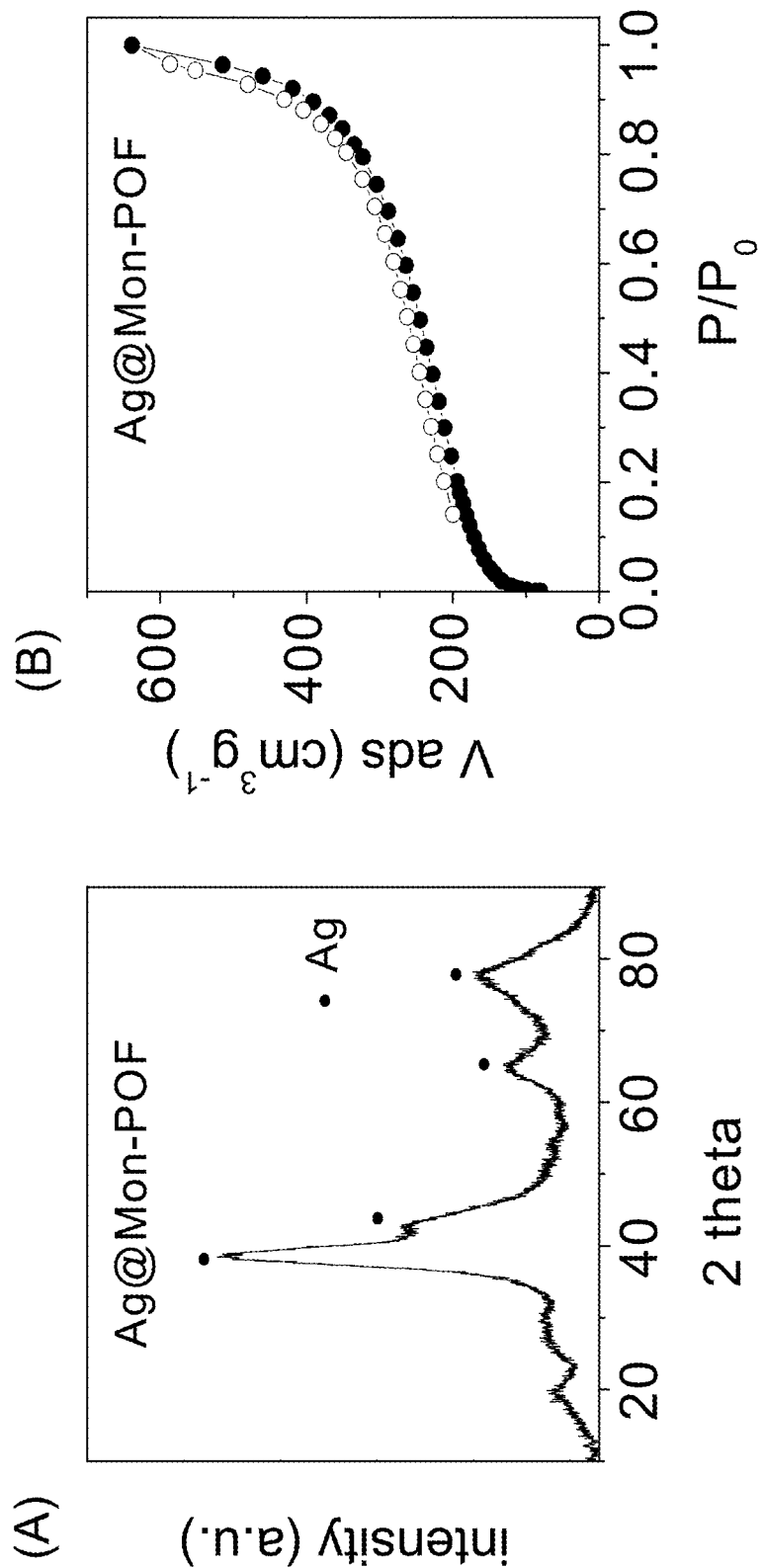
FIG. 12. (A) The x-ray diffraction (XRD) pattern of Ag@Mon-POF. The bullets correspond to Ag diffraction peaks. (B) $N_2$ ads.-des. isotherm of Ag@Mon-POF.

Silver Deposition:

The functionalization of Mon-POF with $Na^+$ ion-exchange prompted the investigation of some basic ion-exchange properties with metals such as $Ag^+$. The materials did indeed lose Na and picked up Ag but, surprisingly, the Ag was reduced to metal nanoparticles. Clearly, the Mon-POF has reductive properties and is capable of reducing $AgNO_3$, probably after ion-exchange as the silver ions enter the material. TEM images of Ag@Mon-POF (FIG. 11) show spherical Ag nanoparticles of 5-10 nm in diameter well dispersed in the polymeric framework. The XRD pattern of Ag@Mon-POF (FIG. 12A) shows broad peaks that correspond to nanocrystalline cubic Ag (pdf 04-0783, ICDD) with an average crystallite size of ~25 Å according to the Scherrer equation. The monolith, after the reaction with $AgNO_3$, was soaked in ethanol and dried with supercritical $CO_2$. The loading of Ag to Mon-POF was significant at ~25 wt. %, as estimated from thermogravimetric analysis. Interestingly the TGA also showed that, in air, the combustion of Ag@Mon-POF was catalyzed by the Ag nanoparticles and occurred in a temperature range from 230° C. to 250° C., in comparison to pristine Mon-POF, which burned out in the range from 300° C. to 520° C. (FIG. 4). The residue of Ag@Mon-POF's TGA was analyzed with XRD, presenting sharp diffraction peaks of elemental Ag. Ag@Mon-POF exhibited an $N_2$ adsorption-desorption isotherm (FIG. 12B) of type II as the pristine monolith and a specific surface area of 690 $m^2$ $g^{-1}$, revealing that the deposited Ag nanoparticles did not block the pores of the monolith.

Ag@Mon-POF composite material combined the properties of low density porous substrate with metallic nanoparticles. Silver nanoparticles have been widely exploited in several fields like catalysis, optics, antimicrobials, biosensing, and SERS and they have been stabilized on macroporous polymeric substrates through the reduction of $AgNO_3$ from $NaBH_4$ or hydrazine at maximum content ~7% wt. In the present case $AgNO_3$ was reduced without any additional reductant and the reductive properties of $Na^+$ Mon-POF is attributed to the phenolic OH groups what can be correlated to the reducing activity of natural polyphenols, which are well known for their antioxidant properties.

Iodine Capture:

With the Ag@Mon-POF at hand a study was conducted as to whether the silver laden material could capture iodine vapor and stabilize it in the form of AgI, eq. (2). This reaction is relevant for the capture and storage of radioisotopes released during reprocessing of spent nuclear fuel—particularly 129-iodine.

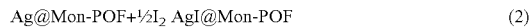

Ag@Mon-POF+½$I_2$ AgI@Mon-POF   (2)

Figure 13:
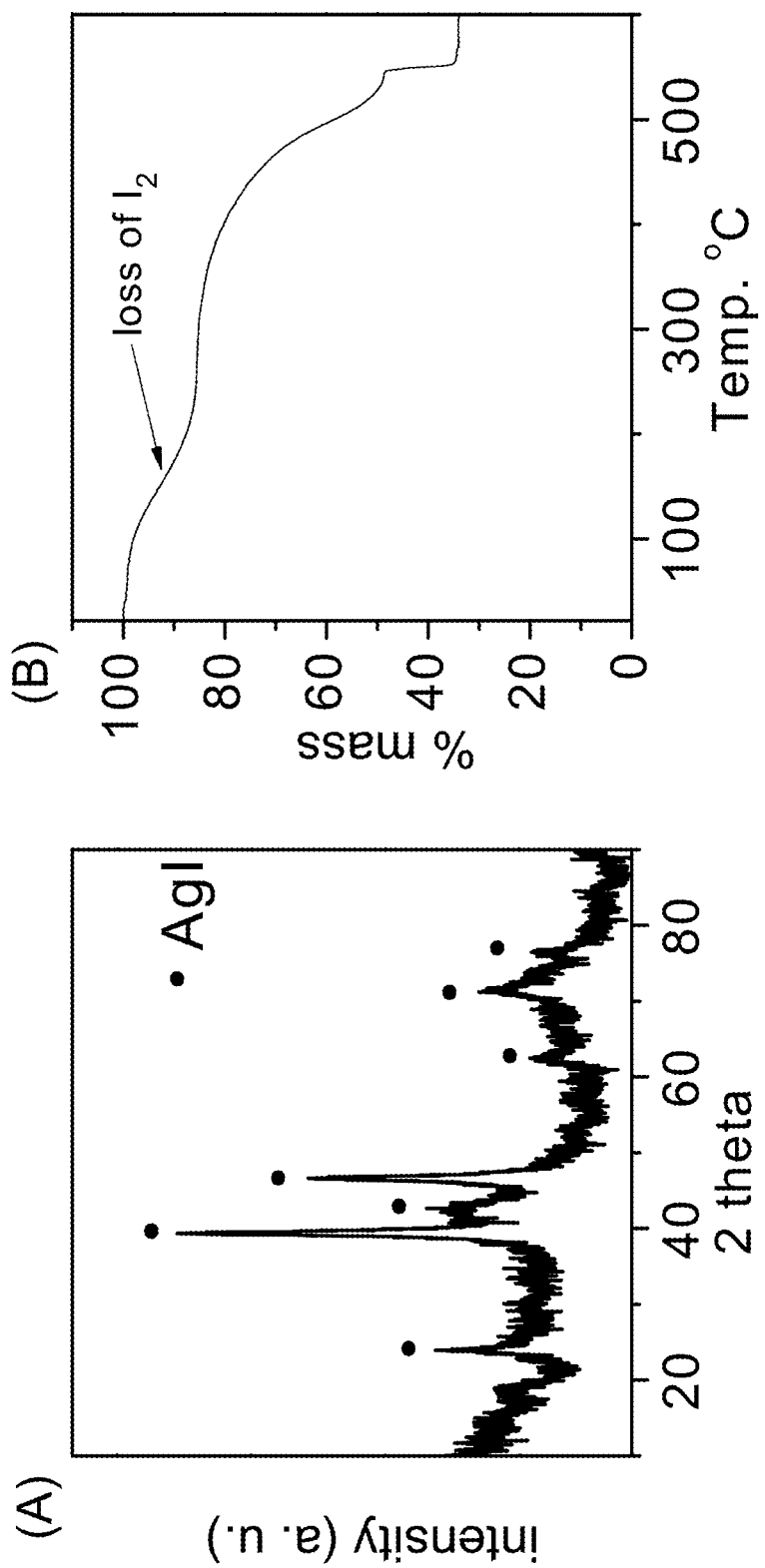
FIG. 13. (A) The XRD pattern and (B) thermogravimetric analysis of Ag@Mon-POF after iodine capture.

The XRD pattern of Ag@Mon-POF after exposure in iodine vapors for 2 hrs is shown in FIG. 13A where the Bragg peaks correspond to hexagonal β-AgI (pdf 09-0374, ICDD) and those of the metallic Ag are absent. The atomic ratio of Ag:I in the material after iodine treatment according to EDS was 2:3, showing excess of I compared to Ag, indicating that in addition to reaction with Ag, iodine vapors were also physically adsorbed in the pores of the monolith. This was verified from the TGA graph (FIG. 13B) of the sample after iodine capture, where a broad mass loss step was observed from 90 to 240° C., ($I_2$ bop.=184° C.). In addition to the high Ag loading, 25 wt. %, the effective capture and storage of $I_2$ on Ag@Mon-POF was facilitated by the high dispersion and the small size of the Ag nanoparticles, as well as the macroporous structure of the monolith that allowed iodine vapors to diffuse readily and access the metallic phase.

The continued interest for alternative waste forms for $^{129}I$ using materials that can provide higher waste loadings makes the Mon-POF presented here of significant interest. To capture iodine, aerogels, silver-loaded zeolites and more recently chalcogels and MOFs have been studied for confinement of iodine radioactive wastes in recent years and are under investigation as waste forms for $^{129}I$. Mon-POFs appear to be an attractive alternative to these systems bringing special advantages such as high loadings, extreme pH stability and mechanical robustness.

Example II

This example illustrates a macroporous polymeric organic framework, Mac-POF-1, prepared from the acid catalyzed reaction of terephthalaldehyde and phloroglucinol. It exhibits high surface area, 1019 $m^2$ $g^{-1}$. Mac-POF-1 reduced $Ag^+$ to Ag nanoparticles forming a nanocomposite material with an Ag loading of ~20 wt. %.

Materials.

All reagents and solvents were used as received unless noted otherwise. Terephthalaldehyde, phloroglucinol, silver nitrate and 1,4-dioxane were purchased from Aldrich Chemical Co. THF, ethanol, HCl and NaOH were purchased from VWR.

Synthesis of Mac-POF-1.

In a round bottom flask amounts of 0.504 g (4 mmol) of phloroglucinol and 0.402 g (3 mmol) of terephthalaldehyde were added in 10 ml of dioxane. The mixture was kept under stirring at 70° C. and 30 min later three drops of aq. HCl 1M was added. In the next two min the whole mixture was solidified. The solid was transferred in a Teflon lined autoclave and purged with $N_2$. The autoclave was heated at 220° C. for 2 days. After cooling at room temperature, a dark red solid was obtained and washed with THF. The solid was dried in vacuum oven at 50° C. overnight. The yield was 95%.

Preparation of Ag Nanoparticles in Mac-POF-1.

100 mg of Mac-POF-1 were mixed with 50 ml of an aqueous solution of 1M NaOH. After 2 h the POFs were collected with filtration. The NaOH-treated POF was mixed with 50 ml of $H_2O$, resulting in a pH=10. In that mixture 200 mg $AgNO_3$ were added and allowed to react overnight. The product was collected with filtration.

Characterization Methods.

$N_2$ adsorption—desorption isotherms were measured at 77 K. The measurements were carried out in an ASAP 2020 and in a Tristar 3020 porosimeter of Micromeritics. The specific surface area was calculated according to the BET method (0.05<P/$P_0$<0.25). Total pore volume was estimated from the adsorbed amount at P/$P_0$=0.97. Micropore volume was determined from t-plots. (Lowell, S.; Shields, J. E.; Thomas, M. A.; Thommes, M. *Characterization of porous solids and powders: surface area, pore size and density*; Kluwer Academic Publishers: Dordrecht, 2004 p. 130.) NLDFT (cylindrical model) was applied to obtain the pore size distribution. Solid state NMR spectra were recorded in a Varian 400 ATX spectrometer operating 100 MHz for $^{13}C$ and 400 for $^1H$. The $^{13}C$ CPMAS measurements were carried out at a spinning rate of 10 kHz. Two pulse phase modulation (TPPM)$^1H$ decoupling was applied during acquisition. The $^{13}C$ were given relative to tetramethylsilane as 0 ppm and calibrated by using adamantane as a secondary reference. XRD powder patterns were collected on a CPS 120 Inel difractometer equipped with CuKα radiation. UV-vis-NIR diffuse reflectance spectra (DRS) were recorded with a Shimadzu UV-3101PC spectrophotometer. $BaSO_4$ powder was used as the 100% reflectance standard. The reflectance data were converted to absorption according to the Kubelka-Munk equation al S=$(1-R)^2$/2R, where R is the reflectance and a and S are the absorption and scattering coefficient, respectively. Thermogravimetric analysis was performed in a Shimadzu TGA-50 thermal analyzer by heating each sample (≈10 mg) from room temperature to 600° C. with a ramping rate of 5° C. $min^{-1}$ under nitrogen or air flow. TEM investigations were carried out in a JEOL 2100F transmission electron microscope operating at a 200 kV accelerating voltage. The sample was dispersed in ethanol and mounted on a carbon coated copper grid.

The copolymerization reaction of terephthalaldehyde with phloroglucinol was drastically accelerated from the acid addition. The colorless dioxane solution was rapidly transformed to orange gel 1 min after the addition of some drops of the aqueous solution of HCl 1M. The polymerization was completed after heating the gels at 220° C. for 2 days. At the molecular level the reaction is like that of microporous POF1B (Katsoulidis, A. P.; Kanatzidis, M. G. *Chem. Mater.* 2011, 23, 1818-1824), where terephthalaldehyde is transformed to a four-site node linking four phloroglucinols through methine carbons (Scheme 3) and each phloroglucinol reacts with three aldehydes molecules Scheme 3. Polymerization reaction of Mac-POF-1 between terephthalaldehyde and phloroglucinol.

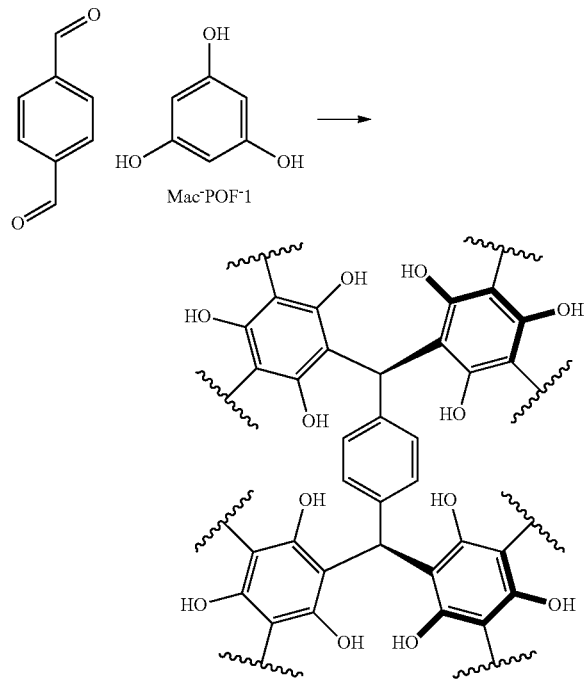

Figure 14:
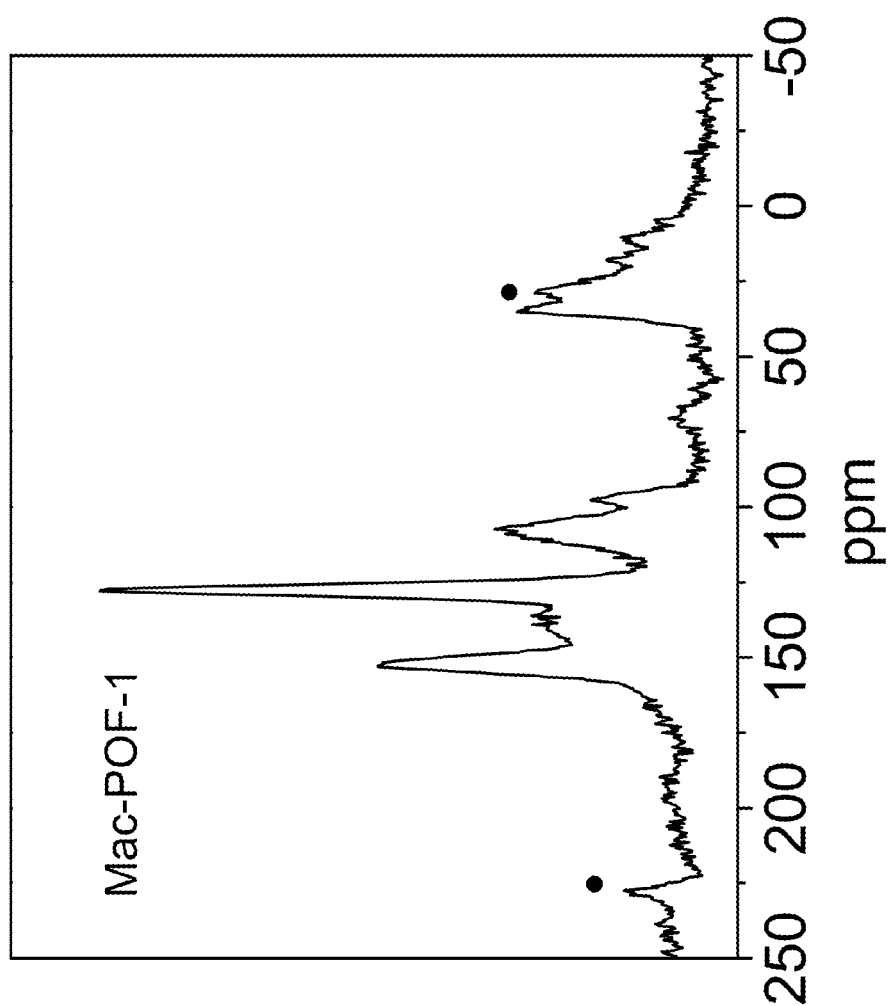
FIG. 14. Solid State $^{13}$C CPMAS NMR of Mac-POF-1. The bullets correspond to the sidebands of the 128 ppm peak.

The formation of the polymer according to the above mentioned reaction was proved with solid state $^{13}$C CPMAS NMR. A typical spectrum of Mac-POF-1 is presented in FIG. 14, where the side bands of the big peak are denoted with bullets. The resonance of the aldehyde carbonyl carbons, 195 ppm, did not appear and a new one emerged at 35 ppm which is attributed to the methyne bridge carbons.

Figure 15:
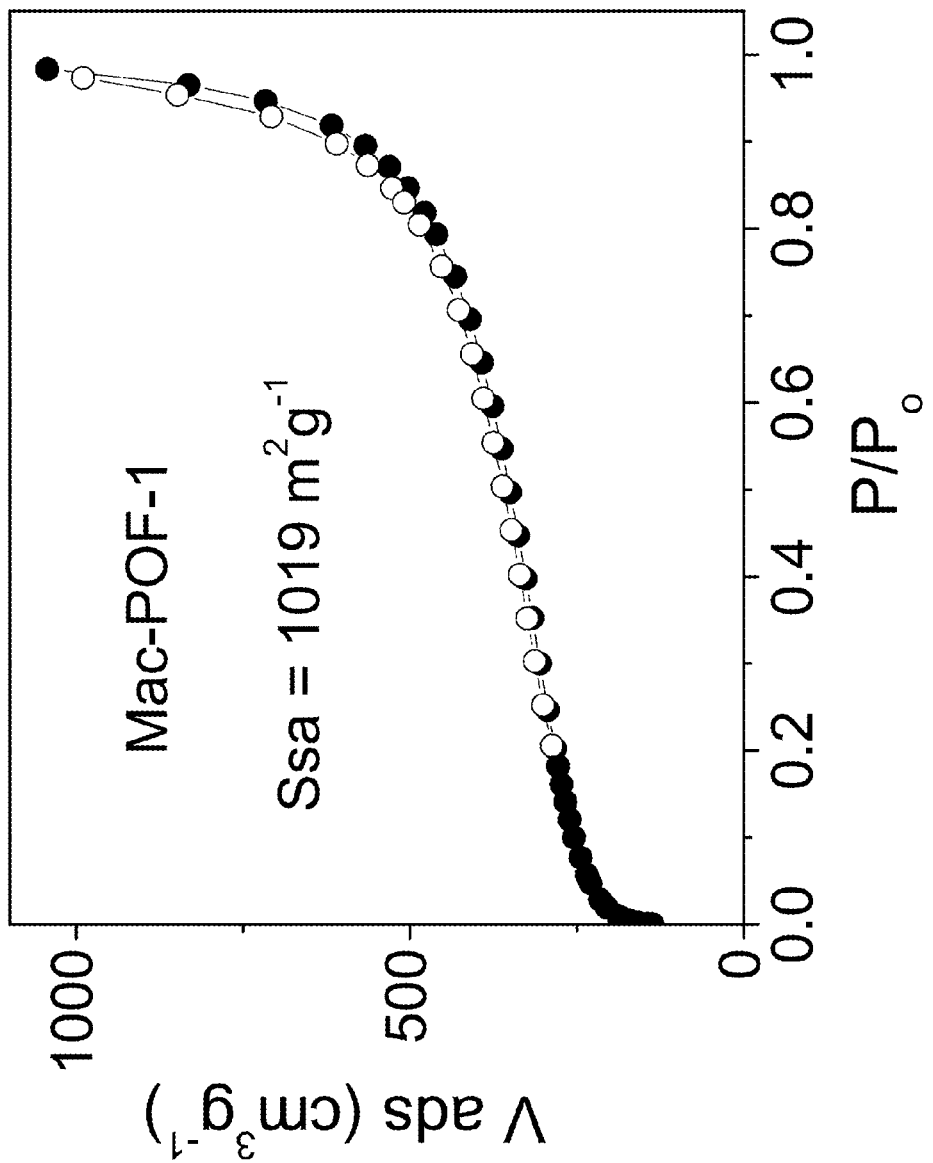
FIG. 15. $N_2$ adsorption-desorption isotherm of Mac-POF-1.

Porous properties of the Mac-POF-1 were investigated with $N_2$ adsorption desorption isotherms (FIG. 15). It exhibited type II isotherm, according to IUPAC, suggesting their macroporous texture, pore diameter >50 nm. The surface area of Mac-POF-1 was 1019 m$^2$ g$^{-1}$ and the total pore volume was 1.13 cm$^3$ g$^{-1}$. The high uptake of $N_2$ at low pressure indicated the existence of micropores in the framework and the exact micropore volume was calculated as 0.22 cm$^3$ g$^{-1}$.

Figure 16:
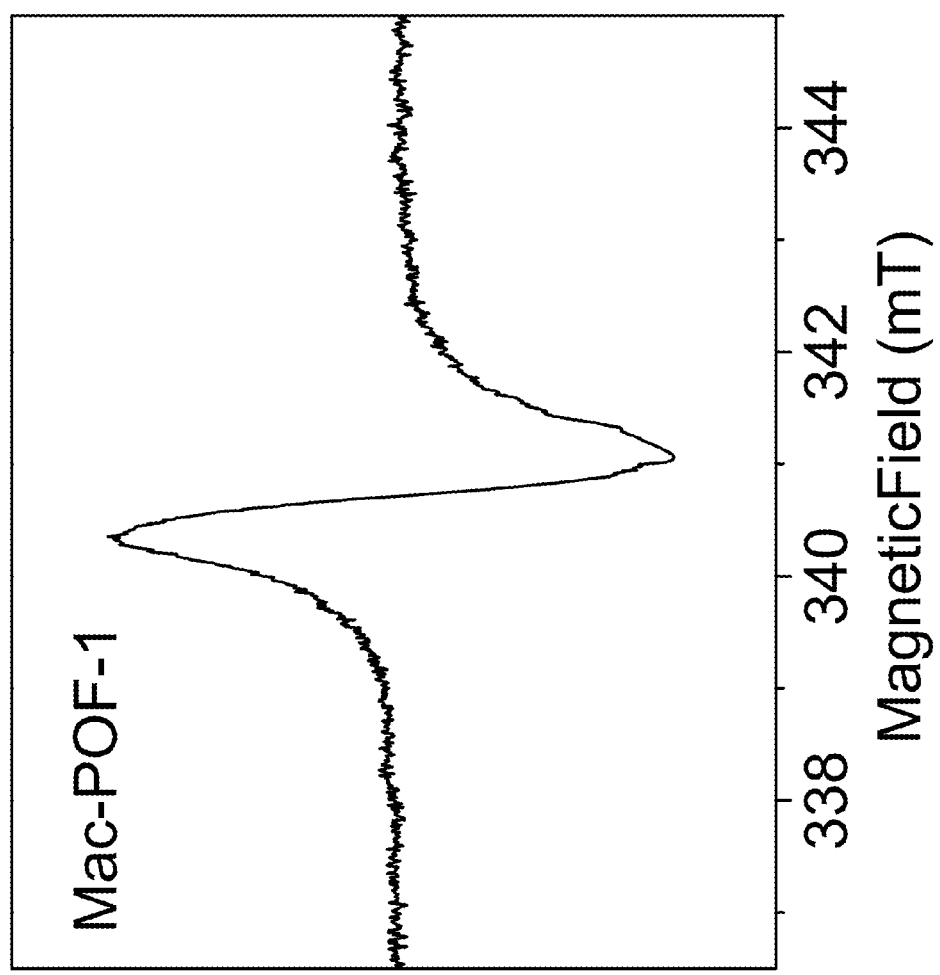
FIG. 16. Solid state EPR spectra of Mac-POF-1.

Mac-POF-1 was characterized with CW EPR spectroscopy at room temperature (FIG. 16). This compound was paramagnetic and showed strong EPR signals, which were 4 mT wide and centered around 341 mT (g factor=2.006). The stabilization of unpaired electrons on the POFs was a simultaneous effect of the polymerization reaction.

Figure 17:
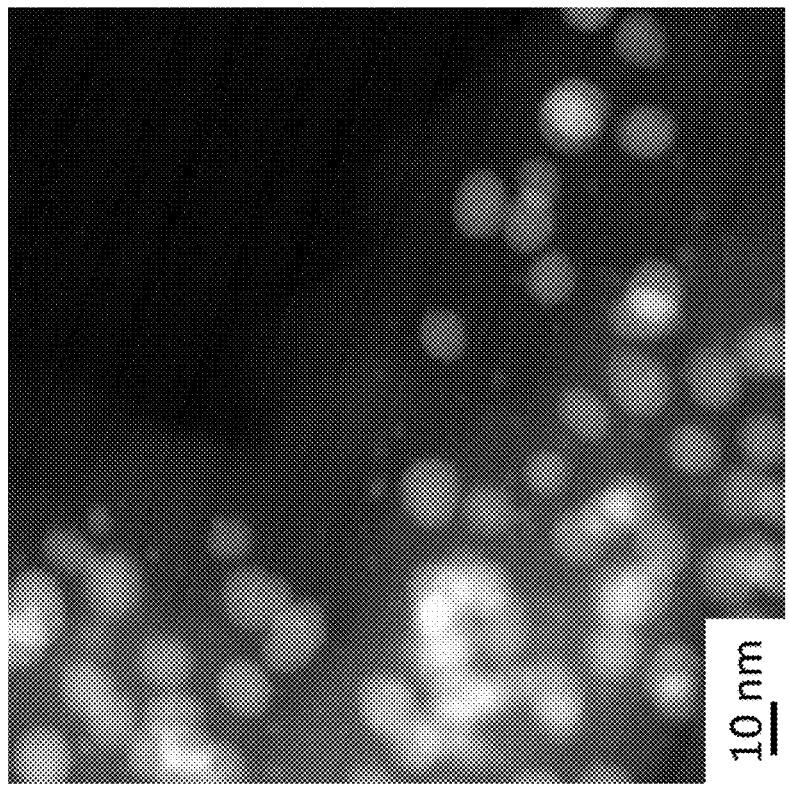
FIG. 17. TEM image of Ag nanoparticles (bright spots) in Mac-POF-1.
Figure 18:
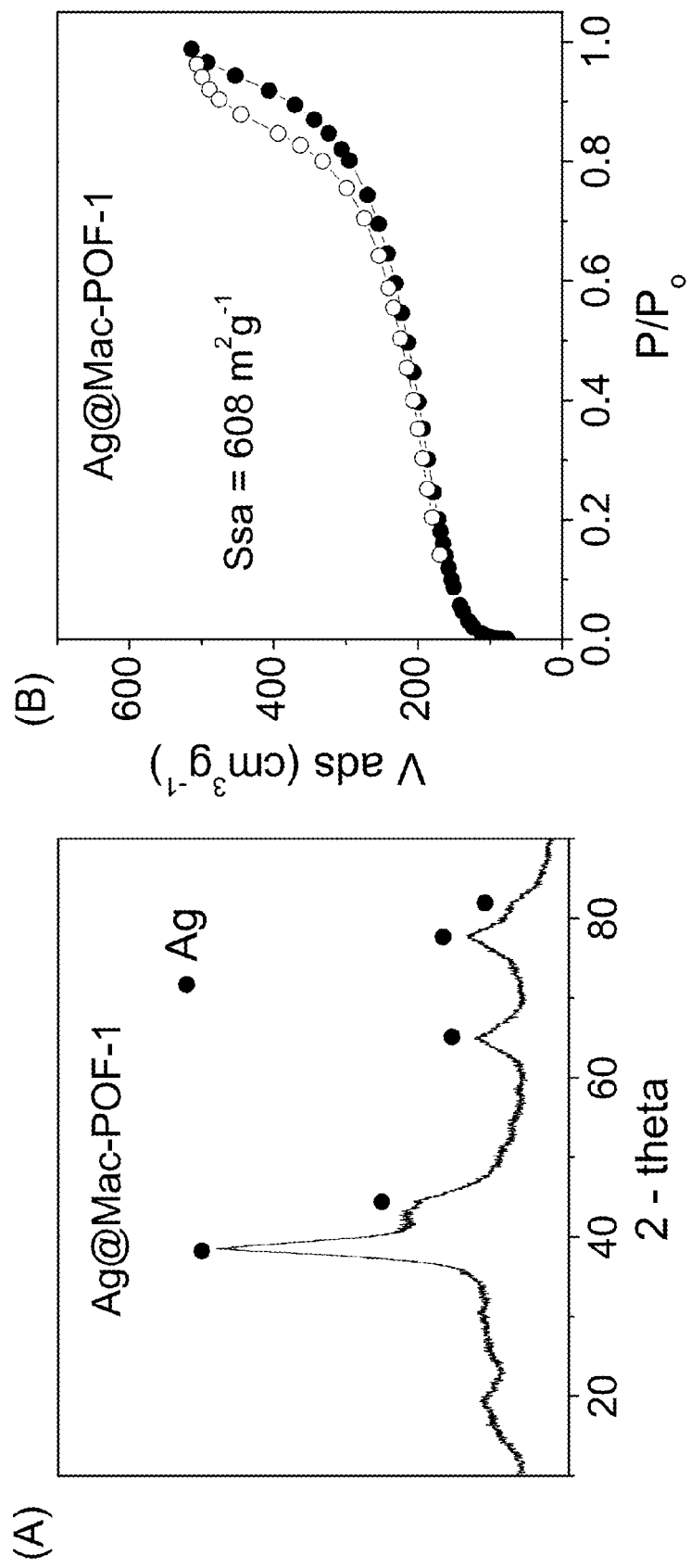
FIG. 18. (A) The XRD pattern of Ag@Mac-POF-1. The bullets correspond to Ag diffraction peaks. (B) $N_2$ ads.-des. isotherm of Ag@Mac-POF-1.

Silver Deposition:

The functionalization of Mac-POF-1 with Na$^+$ ion-exchange prompted the investigation of some basic ion-exchange properties with metals such as Ag$^+$. The Mac-POF-1 had reductive properties and was capable of reducing AgNO$_3$, probably after ion-exchange as the silver ions enter the material. TEM images of Ag@Mac-POF-1 (FIG. 17) showed spherical Ag nanoparticles of 5-10 nm in diameter well dispersed in the polymeric framework. The XRD pattern of Ag@Mon-POF (FIG. 18A) shows broad peaks that correspond to nanocrystalline cubic Ag (pdf 04-0783, ICDD) with an average crystallite size of ~50 Å according to the Scherrer equation. The loading of Ag to Mac-POF-1 was significant at ~20 wt. %, as estimated from thermogravimetric analysis. Ag@Mac-POF-1 exhibited an $N_2$ adsorption-desorption isotherm (FIG. 18B) of type II as the pristine polymer and a specific surface area of 608 m$^2$ g$^{-1}$, revealing that the deposited Ag nanoparticles did not block the pores of the monolith.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A composite material comprising:
(a) a porous, three-dimensional, aromatic polymeric network comprising an organic polymer comprising phenolic groups, wherein the phenolic groups are cross-linked through linkages comprising one or more non-phenolic aromatic rings; and
(b) metal nanoparticles distributed within the polymeric network.

2. The material of claim 1, wherein the phenolic groups comprise hydroxynaphthalene groups.

3. The material of claim 1, wherein the phenolic groups comprise phloroglucinol groups.

4. The material of claim 1, wherein the metal nanoparticles comprise silver nanoparticles.

5. The material of claim 1, wherein the metal nanoparticles comprise lead nanoparticles.

6. The material of claim 1, wherein the metal nanoparticles comprise gold nanoparticles.

7. The material of claim 1, wherein the metal nanoparticles comprise tin, bismuth or antimony nanoparticles.

8. The material of claim 1, wherein the polymeric network has a specific surface area of at least 500 m$^2$/g, as measured by BET.

9. The material of claim 1, wherein the polymeric network has stable unpaired electrons and exhibits a strong EPR signal at g≈2.006.

10. The material of claim 1 having a metal nanoparticle loading of at least 20 percent by weight, based on the total weight of the organic polymer and the metal nanoparticles.

11. The material of claim 1, wherein the phenolic groups comprise two or more aromatic rings.

12. The material of claim 11, wherein the two or more aromatic rings are fused.

13. The material of claim 1, wherein an aromatic ring of the phenolic group is functionalized with an —SH or an —NH$_2$ group.

14. The material of claim 1, wherein the linkages comprise two or more non-phenolic aromatic rings.

15. The material of claim 1 having a hydroxyl functionality density in the range from 1 to 2 —OH groups per phenyl ring.

* * * * *